(12) United States Patent
Woo et al.

(10) Patent No.: US 9,444,251 B2
(45) Date of Patent: Sep. 13, 2016

(54) POWER SUPPLY AND DISPLAY APPARATUS HAVING THE SAME

(71) Applicant: SAMSUNG ELECTRONICS CO., LTD., Suwon-si (KR)

(72) Inventors: Won Myung Woo, Seoul (KR); Jin Hyung Lee, Anyang-si (KR); Gil Yong Chang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 481 days.

(21) Appl. No.: 13/731,258

(22) Filed: Dec. 31, 2012

(65) Prior Publication Data

US 2013/0169612 A1    Jul. 4, 2013

(30) Foreign Application Priority Data

Dec. 29, 2011 (KR) .................. 10-2011-0145609
May 3, 2012 (KR) .................. 10-2012-0046888

(51) Int. Cl.
*H02J 1/00* (2006.01)
*H02M 1/42* (2007.01)
*H02J 9/00* (2006.01)

(52) U.S. Cl.
CPC ............ *H02J 1/00* (2013.01); *H02J 9/005* (2013.01); *H02M 1/4208* (2013.01); *Y02B 70/126* (2013.01); *Y10T 307/625* (2015.04)

(58) Field of Classification Search
USPC ..................................... 307/62–66
See application file for complete search history.

(56) References Cited

U.S. PATENT DOCUMENTS

2005/0242772 A1* 11/2005 Cha .................. H02J 7/34
                                                        320/115
2011/0012428 A1*  1/2011 Chen ................ H02J 9/005
                                                        307/66

FOREIGN PATENT DOCUMENTS

| CN | 201422077 Y | 3/2010 |
| EP | 1209793 A1 | 5/2002 |
| EP | 2343624 A2 | 7/2011 |
| EP | 2343624 A3 | 7/2011 |

(Continued)

OTHER PUBLICATIONS

Communication issued Dec. 1, 2015, issued by the State Intellectual Property Office of the People's Republic of China in counterpart Chinese Patent Application No. 201210592833.2.

(Continued)

*Primary Examiner* — Jared Fureman
*Assistant Examiner* — Aqeel Bukhari
(74) *Attorney, Agent, or Firm* — Sughrue Mion, PLLC

(57) ABSTRACT

A power supply includes: a first switch arranged between an input power supplier and a load; a driving power supplier to receive input power through the first switch and to supply the input power to the load when a current mode of the load is a normal mode; and a power-saving power supplier connected to a power line branched from between the input power supplier and the first switch, the power-saving power supplier generating standby power when the current mode is a standby mode, and including a second switch connected to the power line, a charger to charge power transmitted through the second switch and to output the charged power as the standby power, a voltage detector to detect the voltage of the charged power, and a first controller to receive driving power from the charger and to control operation of the second switch according to the detected voltage.

30 Claims, 13 Drawing Sheets

(56) References Cited

FOREIGN PATENT DOCUMENTS

| | | |
|---|---|---|
| JP | 2008167629 A | 7/2008 |
| KR | 1020050112574 A | 12/2005 |
| KR | 100967438 B1 | 6/2010 |
| WO | 2010015857 A1 | 2/2010 |

OTHER PUBLICATIONS

Communication dated Jul. 31, 2015, issued by the European Patent Office in counterpart European Application No. 12199423.0.

Communication dated May 31, 2016, issued by the European Patent Office in counterpart European Application No. 12199423.0.

* cited by examiner

POWER SUPPLY AND DISPLAY APPARATUS
HAVING THE SAME

CROSS-REFERENCE TO RELATED APPLICATIONS

This application claims priority from Korean Patent Application No. 10-2011-0145609, filed on Dec. 29, 2011 in the Korean Intellectual Property Office, and Korean Patent Application No. 2012-0046888, filed on May 3, 2012 in the Korean Intellectual Property Office, the disclosures of which are incorporated herein by reference in their entireties.

BACKGROUND

1. Field

Apparatuses and methods consistent with exemplary embodiments relate to a power supply for minimizing standby power and a display apparatus having the same.

2. Description of the Related Art

People use electric devices such as a television (TV) receiver, an electric fan, an air conditioner, an audio system, a computer, etc., at home and in offices. These electric devices can be remotely controlled by a remote controller developed to improve user convenience.

An electric device is in a standby mode when it is not used while being connected to a commercial alternating current (AC) power supply. At this time, the electric device cannot be separated from the commercial power supply, and thus the electric device consumes standby power of hundreds of milliwatts (mW) or several watts (W). This standby power amounts to 11% of home power consumption.

Particularly, an electric device communicating with a remote controller further consumes a predetermined amount of standby power in order to receive a signal from the remote controller in the standby mode. Accordingly, a technology for reducing standby power is demanded.

The technology for reducing standby power is also demanded for a display apparatus that operates for a long time in a standby mode, consumes high power during a driving period, and uses various types of power.

Accordingly, various technologies for decreasing standby power have been developed.

The technologies include a technique using a switching mode power supply (SMPS) and a technique using a secondary cell.

The technique using an SMPS rectifies AC voltage supplied from a commercial power supply, provides the rectified voltage to a transformer, converts the level of the voltage supplied to the transformer by intermittently controlling a switching element, and uses the converted voltage as standby power.

In this case, although standby power is very low, an internal transformer of the SMPS is to continuously operate in order to supply the standby power, resulting in inevitable consumption of power. Furthermore, efficiency of the transformer of the SMPS decreases because the transformer provides power that is much lower than rated power.

The technique using a secondary cell charges power in the secondary cell and uses the power charged in the secondary cell as standby power in a standby mode.

This technique can eliminate standby power. However, the secondary cell is discharged after a predetermined time because the charging quantity of the secondary cell is limited. Furthermore, it is necessary to additionally provide separate components for charging the secondary cell and supplying power to the secondary cell.

SUMMARY

Therefore, one or more exemplary embodiments provide a power supply including a receiver of a remote controller receiver, which is provided to one side thereof, and a charger that supplies driving power to the receiver and a display apparatus having the power supply.

One or more exemplary embodiments provide a power supply to control a standby mode to switch to a deep sleep mode and a sleep mode and a display apparatus having the power supply.

According to an aspect of an exemplary embodiment, there is provided a power supply including: a first switch arranged between an input power supplier and a load; a driving power supplier to receive input power of the input power supplier through the first switch and to supply the input power to the load as driving power when a current mode of the load is a normal mode; and a power-saving power supplier connected to a power line branched from a point between the input power supplier and the first switch, the power-saving power supplier generating standby power using the input power when the current mode of the load is a standby mode, wherein the power-saving power supplier includes: a second switch connected to the power line; a charger to charge power transmitted through the second switch and to output the charged power as the standby power; a voltage detector to detect the voltage of the power charged in the charger; and a first controller to receive driving power from the charger and to control operation of the second switch on the basis of the detected voltage.

The power-saving power supplier may further include a voltage adjuster to adjusts the voltage of the input power supplied through the power line to a voltage at a predetermined level, and a first power converter connected to a standby power output port, the first power converter converting power corresponding to the adjusted voltage to the standby power and outputting the standby power to a standby power output port.

The charger may be connected in parallel between the first power converter and the standby power output port.

The power-saving power supplier further includes a third switch connected to the charger, wherein the first controller controls the second switch to be turned on such that the standby power converted by the first power converter is applied to the load and controls the third switch to be turned off when the current mode of the load is a normal mode.

The first controller may control the second switch and the third switch to be turned off such that the power charged in the charger is output when the current mode of the load is a standby mode.

The power-saving power supplier may further include a booster to convert the voltage of the power output from the charger to a predetermined voltage and to apply the predetermined voltage to the load.

The first controller may control the second switch and the third switch to be turned on when the detected voltage is lower than a first reference voltage.

The first controller may control the second switch and the third switch to be turned off when the detected voltage is higher than the first reference voltage.

The power-saving power supplier may further include a voltage adjuster to adjust the voltage of the input power supplied through the power line to a voltage at a predetermined level, and a first power converter serially connected to the charger to convert power corresponding to the adjusted voltage to power for charging of the charger and to apply the converted power to the charger, wherein the first controller controls the second switch to be turned off such that the power charged in the charger is output to the load and controls the second switch to be turned on when the detected voltage is lower than the first reference voltage.

The first switch may be turned on when an on signal is input from the load and turned off when an off signal is input from the load.

The charger may include a super capacitor.

The driving power supplier may include a first rectifier to rectify the input power applied through the first switch, a power factor improver connected to the first rectifier to improve the power factor of the power rectified by the first rectifier, and a driving power converter connected to the power factor improver to convert the power with the improve power factor to power for driving the load and to output the converted power to the load.

The power-saving power supplier may further include a first receiver to receive a power on/off signal of the load from a remote controller and to receive the power for driving from the charger, wherein the first controller checks the current mode of the load on the basis of a signal transmitted from the remote controller, controls the first switch to be turned on when the current mode of the load is a normal mode, and controls the first switch to be turned off when the current mode of the load is a standby mode.

The power-saving power supplier may further include a second rectifier connected to the power line to rectify the input power supplied from the input power supplier, and a first power converter to convert the power rectified by the second rectifier and to output the converted power to the charger.

The power-saving power supplier may further include a third rectifier arranged between the first switch and the first rectifier to rectify the input power applied through the first switch, and a second power converter to convert the power rectified by the second rectifier to the standby power and to output the standby power to the load.

The power-saving power supplier may further include a fourth switch connected to a first standby power output port of the second power converter and turned on in response to a control signal of a second controller included in the load, wherein the second power converter outputs the standby power through the first standby power output port when the fourth switch is turned on and outputs the standby power through a second standby power output port of the second power converter when the fourth switch is turned off.

The power supply may further include a fifth switch arranged between the second controller of the load and the power factor improver and turned on in response to a control signal of the second controller, wherein the power factor improver is driven to improve the power factor of the power rectified by the first rectifier when the fifth switch is turned on, and apply the power with the improved power factor to the driving power converter.

According to an aspect of another exemplary embodiment, there is provided a power supply including: a first switch arranged between an input power supplier and a load; a driving power supplier to receive input power of the input power supplier through the first switch, to convert the input power and to supply the converted input power to the load as driving power when the current ode of the load is a normal mode; and a power-saving power supplier connected to a power line branched from a point between the input power supplier and the first switch, the power-saving power supplier converting the input power to a standby power, wherein the power-saving power supplier includes: a first standby power supplier including a second switch connected to the power line, a charger to charge power transmitted through the second switch, a voltage detector to detect the voltage of the charger, and a first receiver to receive a signal of a remote controller, the first standby power supplier supplying the power charged in the charger to the first receiver as standby power; a second standby power supplier to convert the input power supplied through the first switch to standby power and to apply the standby power to a second receiver included in the load; and a first controller to control operation of the first switch such that the standby power is supplied through at least one of the first standby power unit and the second standby power supplier and to control operation of the second switch on the basis of the detected voltage when the current mode of the load is a standby mode.

The driving power supplier may include a first rectifier arranged between the first switch and the load to rectify the input power, a power factor improver connected to the first rectifier to improve the power factor of the power rectified by the first rectifier, and a driving power converter connected to the power factor improver to convert the power with the improved power factor to power for driving power of the load and to output the driving power to the load.

The first standby power supplier may further include a second rectifier to rectify the input power input from the input power supplier and a first power converter to convert the rectified power to power at a predetermined level and to apply the converted power to the charger, and the second standby power supplier includes a third rectifier arranged between the first switch and the second rectifier to rectify the input power applied through the first switch and a second power converter to convert the power rectified by the third rectifier to standby power and to output the standby power through a first standby power output port or a second standby power output port.

The second standby power supplier may further include a fourth switch that is connected to the first standby power output port, is turned on in the normal mode and is turned off in the standby mode.

The power supply may further include a fifth switch turned off in the standby mode and turned on in the normal mode, the fifth switch applying power to the power factor improver such that the power factor improver operates.

The first controller may compare the detected voltage with reference voltages, control the second switch to be turned on when the detected voltage is lower than a first reference voltage, and control the second switch to be turned off when the detected voltage is higher than a second reference voltage.

The first controller may control the load to operate in the normal mode when an on signal is received from the remote controller and control operation of the second switch on the basis of the detected voltage in the normal mode.

The first controller may control the first switch to be turned off such that the first receiver receives a signal of the remote controller when a deep sleep mode selection signal is transmitted from the load in the standby mode, and control the first switch to be turned on such that the second receiver receives the signal of the remote controller when a sleep mode selection signal is transmitted in the standby mode.

The power supply may further include a sixth switch arranged between a second controller included in the load and the first controller, wherein the first controller receives the sleep mode selection signal and interrupts the operation of the first receiver when the sixth switch is turned on.

The first controller may control the first switch to be maintained in a turned off state when the first receiver receives an off signal while the deep sleep mode is selected and control the first switch to be turned on when the first receiver receives an on signal while the deep sleep mode is selected.

According to an aspect of another exemplary embodiment, there is provided a display apparatus including: a power supply including a first switch arranged between an input power supplier and a load, a driving power supplier to convert input power of the input power supplier, supplied through the first switch, to driving power when a current mode of the load is a normal mode, and a power-saving power supplier connected to a power line branched from a point between the input power supplier and the first switch to convert the input power to a standby power; a load including a second receiver to receive a signal of a remote controller, a driver to drive a display panel, and a second controller to control operation of the driver and to block driving power supplied to the driver on the basis of a signal of the remote controller, wherein the power-saving power supplier of the power supply includes: a first standby power supplier including a second switch connected to the power line, a charger to charge power transmitted through the second switch, a voltage detector to detect the voltage of the charger, and a first receiver to receive a signal of a remote controller, the first standby power supplier supplying the power charged in the charger to the first receiver as standby power; a second standby power supplier to convert the input power supplied through the first switch to standby power and to apply the standby power to a second receiver included in the load; and a first controller to control operation of the first switch such that the standby power is supplied through at least one of the first standby power supplier and the second standby power supplier and to control operation of the second switch on the basis of the detected voltage when the current mode of the load is a standby mode.

The first controller may switch a deep sleep mode to the normal mode if an on signal is input to the first receiver when the standby mode corresponds to the deep sleep mode.

The first controller may interrupt operation of the first receiver when the current mode is the normal mode.

The first controller may control the first switch to be turned on when the current mode corresponds to the normal mode and the sleep mode and control the first switch to be turned off when the current mode corresponds to the deep sleep mode.

The second controller may control the current mode to switch to the normal mode when a power on signal is input to the second receiver while standby power is supplied from the second standby power supplier.

The second standby power supplier may have a first standby power output port and a second standby power output port and may include a second power converter to convert the input power to standby power and to output the standby power through the first standby power output port or the second standby power output port and a fourth switch connected to the first standby power output port, turned on in the normal mode and turned off in the standby mode.

The driving power supplier may include a first rectifier arranged between the first switch and the load to rectify the input power, a power factor improver connected to the first rectifier to improve the power factor of the power rectified by the first rectifier, and a driving power converter connected to the power factor improver to convert the power with the improved power factor to driving power of the load and to output the driving power to the load.

The power supply of the display apparatus may further include a fifth switch connected to the power factor improver, wherein the second controller controls the fourth switch and the fifth switch to be turned on such that the driving power is supplied to the load when the current mode is the normal mode.

The power supply may further include a sixth switch arranged between the second controller and the first controller, wherein the second controller controls the sixth switch to be turned on when the sleep mode is selected and controls the sixth switch to be turned off when the deep sleep mode is selected.

The load may further include a storage unit to store the sleep mode or deep sleep mode set before switching to the standby mode, wherein the second controller determines whether the stored standby mode is the sleep mode or the deep sleep mode when the standby power is applied, switches the deep sleep mode to the normal mode when the stored standby mode is the deep sleep mode, and maintains the sleep mode when the stored standby mode is the sleep mode.

The second controller may determine whether the standby power applied through the second power converter is input through the first standby power output port or the second standby power output port, determine that the current mode is the normal mode when the standby power is input through the first standby power output port, and determine that the current mode is the sleep mode when the standby power is input through the second standby power output port.

According to an aspect of another exemplary embodiment, there is provided a power-saving power supplier connected to a power supply for a load, from a point between an input power supplier and the load, the input power supplier supplying driving power to the load when a current mode of the load is a normal mode, the power-saving power supplier including: a switch connected to the point, a charger which charges input power transmitted from the input power supplier through the switch and which outputs the charged power as standby power when the current mode of the load is a standby mode, a voltage detector which detects a voltage of the power charged in the charger, and a controller which receives driving power from the charger and which controls an operation of the switch according to the detected voltage.

According to aspects of one or more exemplary embodiments, standby power for maintaining a standby mode of a load is supplied through a power supply included in an electric device and power conversion is performed only when a super capacitor needs to be charged since the super capacitor has been discharged, and thus power consumed to convert power can be reduced to eliminate the standby power.

Furthermore, only standby power for receiving a remote controller signal is supplied through the power supply included in the electric device and power conversion is performed only when the super capacity needs to be charged since the super capacitor has been discharged. Accordingly, power consumed to convert power can be reduced to make the standby power zero.

As described above, it is possible to prevent manufacturing cost of the power supply from increasing by making the standby power zero using the super capacitor.

Moreover, it is possible to make standby power in a standby mode of a display apparatus zero and reduce power consumption according to standby power reduction. This can alleviate financial burden of a user.

In addition, the display apparatus can automatically perform update on the basis of data transmitted from an external device even in the standby mode.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION OF EXEMPLARY EMBODIMENTS

Reference will now be made in detail to exemplary embodiments, examples of which are illustrated in the accompanying drawings.

Figure 1:
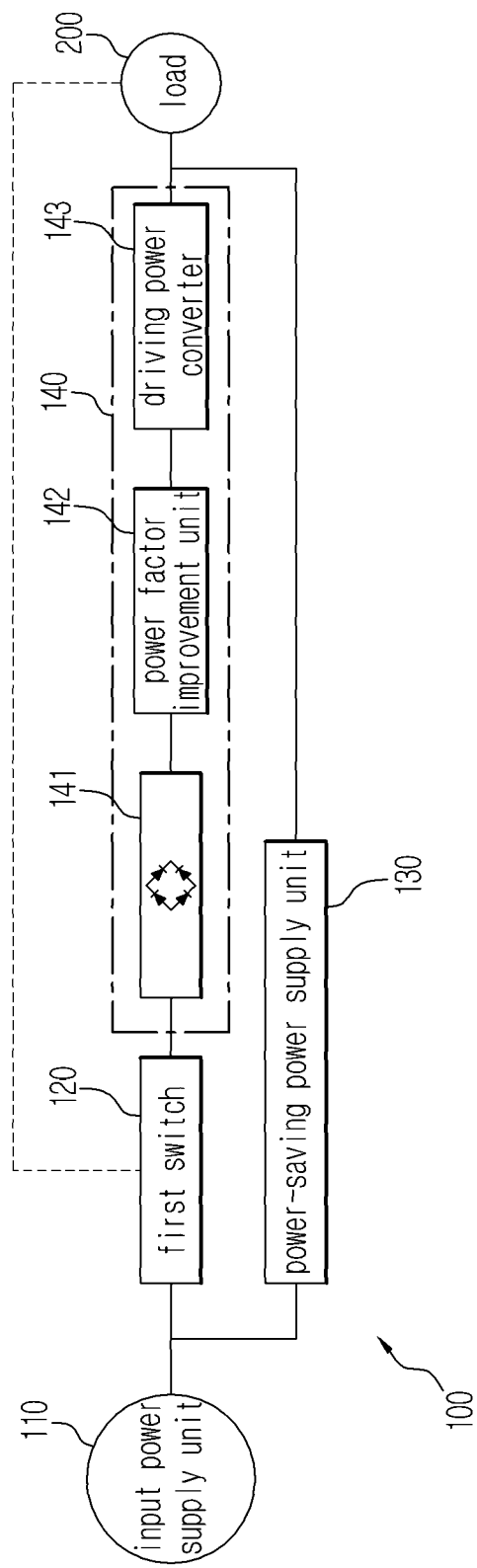
FIG. 1 shows a configuration of a power supply according to an exemplary embodiment.
Figure 2:
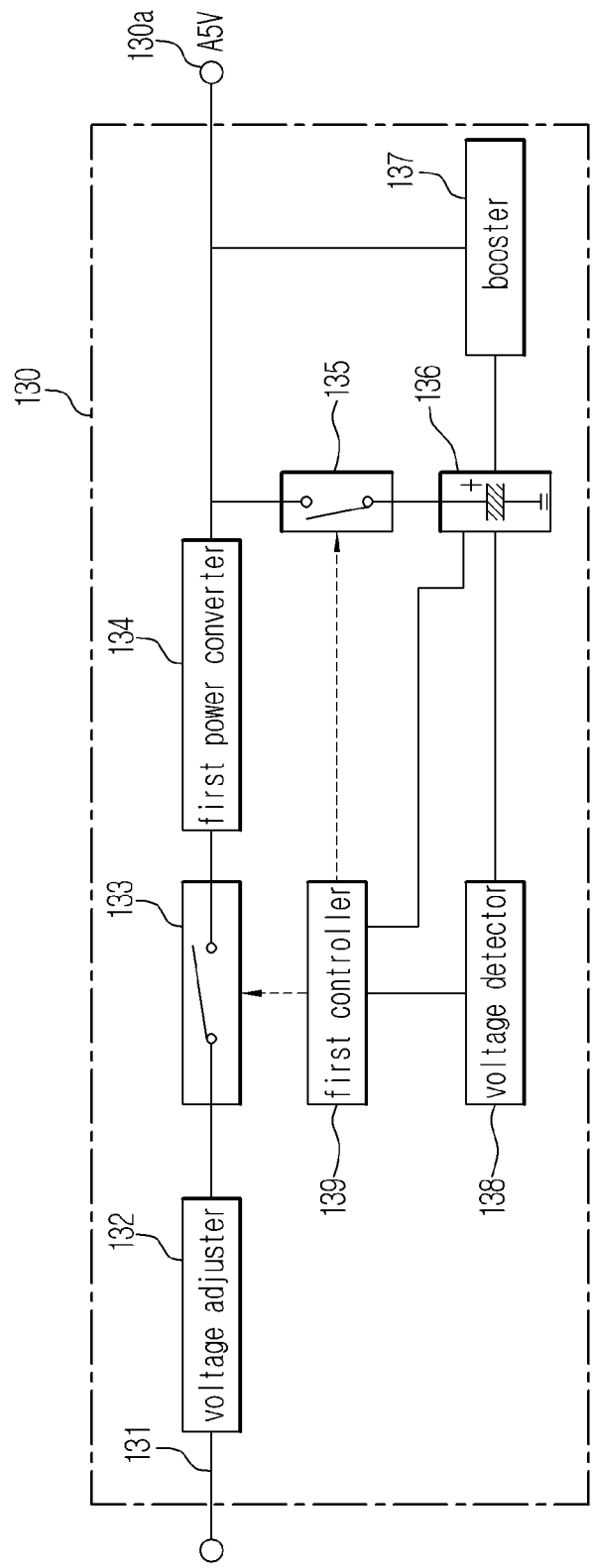
FIG. 2 shows a configuration of a power-saving power supply unit included in the power supply shown in FIG. 1 according to an exemplary embodiment.
Figure 3:
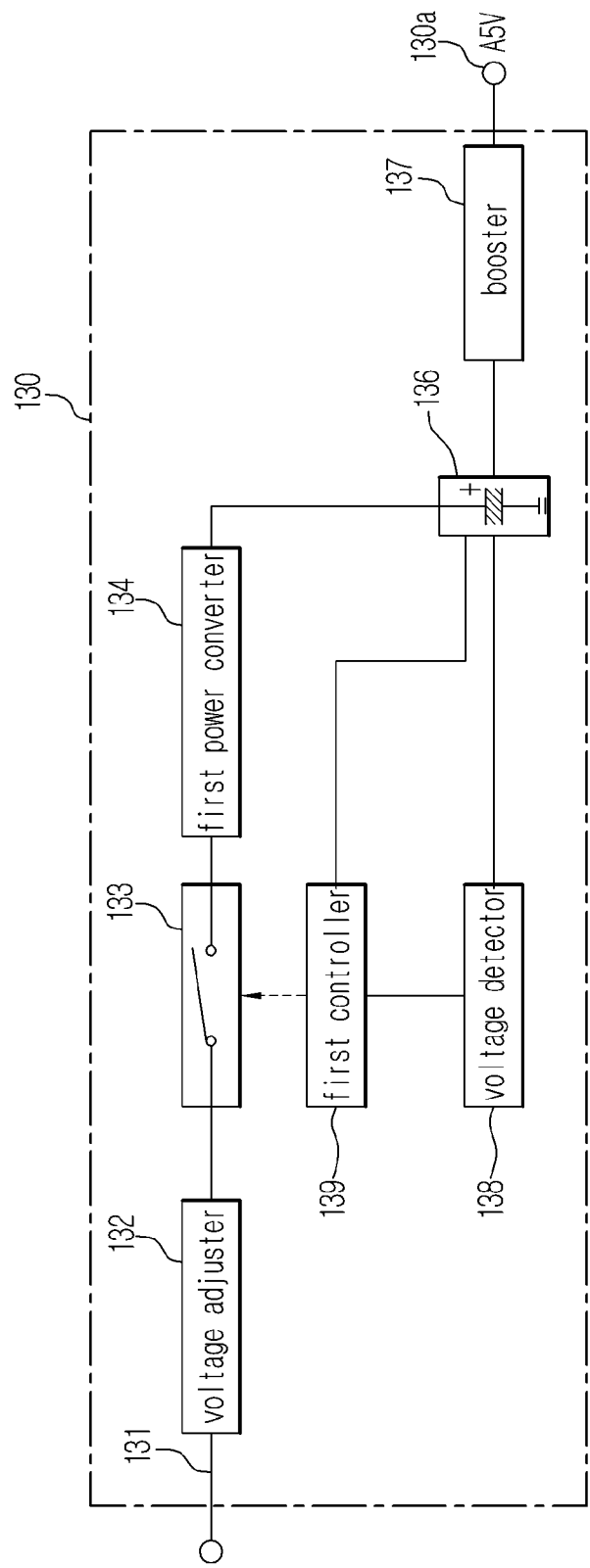
FIG. 3 shows a configuration of the power-saving power supply unit included in the power supply shown in FIG. 1 according to another exemplary embodiment.

FIG. 1 shows a configuration of a power supply according to an exemplary embodiment, FIG. 2 shows a configuration of a power-saving power supply unit included in the power supply shown in FIG. 1 according to an exemplary embodiment, and FIG. 3 shows a configuration of the power-saving power supply unit included in the power supply shown in FIG. 1 according to another exemplary embodiment.

A power supply 100 according to an exemplary embodiment is provided to an electric device and supplies driving power or standby power to each load in the electric device. The power supply 100 supplies the driving power and standby power to each load when the electric device is in a normal mode and provides standby power only to a load for receiving a signal for changing a standby mode to the normal mode when the electric device is in the standby mode.

The load for receiving the signal for changing the standby mode to the normal mode includes at least one of a receiver of a remote controller and an on signal input unit of a power button.

As shown in FIG. 1, the power supply 100 includes an input power supply unit 110 (e.g., input power supplier), a first switch 120, a power-saving power supply unit 130 (e.g., power-saving power supplier), and a driving power supply unit 140 (e.g., driving power supplier).

The input power supply unit 110 is connected to an external commercial power supply to receive power from the external commercial power supply and supplies the received power to at least one of the power-saving power supply unit 130 and the driving power supply unit 140.

The power of the input power unit 110 is supplied to the power-saving power supply unit 130 to be used as standby power to maintain a standby mode of a load 200 when the load 200 is in the standby mode, or provided to the driving power supply unit 140 to be used as driving power to drive the load 200 when the load 200 is in a normal mode.

The first switch 120 is turned on in response to a control signal transmitted from the load 200 when the current mode of the load 200 is the normal mode and turned off in response to a control signal transmitted from the load 200 when the current mode of the load 200 is the standby mode.

Accordingly, the first switch 120 can allow the power of the input power supply unit 110 to be provided to the driving power supply unit 140 when the load 200 is in the normal mode and block the power supplied to the driving power supply unit 140 when the load 200 is in the standby mode.

The first switch 120 includes a relay.

The power-saving power supply unit 130 is connected to a power line 131 (FIG. 2) branched from a point between the input power supply unit 110 and the first switch 120 and is provided with the power from the input power supply unit 110 through the power line 131. The power-saving power supply unit 130 can receive the power from the input power supply unit 110 regardless of an on/off state of the first switch 120.

The power-saving power supply unit 130 charges and discharges the power supplied through the input power supply unit 110 and provides discharged power to the load 200. Here, the discharged power is used as standby power of the load 200.

The power-saving power supply unit 130 converts the power of the input power supply unit 110 into power suitable for charging only during a charging operation while the standby power is supplied to the load 200, and thus power consumption according to power conversion can be reduced.

The power-saving power supply unit 130 may convert the power of the input power supply unit 110 to power at a predetermined level and directly supply the converted power to the load 200 when the load 200 is in the normal mode. Here, the power at a predetermined level is standby power.

The driving power supply unit 140 receives the power of the input power supply unit 110 through the first switch 120, converts the received power into driving power to drive the load 200, and applies the driving power to the load 200.

The driving power supply unit 140 includes a first rectifier 141, a power factor improvement unit 142, and a driving power converter 143.

The first rectifier 141 is connected to the first switch 120 and rectifies the input power applied thereto through the first switch 120 when the first switch 120 is turned on. The first rectifier 141 may be a bridge diode including a plurality of diodes and full-wave-rectifies the input power.

The first rectifier 141 is connected to the power factor improvement unit 142.

The power factor improvement unit 142 improves the power factor of the power full-wave-rectified by the first rectifier 141 by correcting the power factor.

The power factor improvement unit 142 is connected to the driving power converter 143.

The driving power converter 143 converts the power with the improved power factor into the driving power to drive the load 200 and supplies the driving power to the load 200. The driving power converter 143 may include an LLC DC-DC converter.

In summary, the power supply 100 turns the first switch 120 to a first state (e.g., on) to supply the power of the input power supply unit 110 to the first rectifier 141 through the first switch when the load 200 is in the normal mode, rectifies the input power through the first rectifier 141, applies the rectified power to the power factor improvement unit 142, improves the power factor of the rectified power through the power factor improvement unit 142, applies the power with the improved power factor to the driving power converter 143, converts the power with the improved power factor into the driving power to drive the load 200 through the driving power converter 143, and supplies the driving power to the load 200.

The power-saving power supply unit 130 receives the power from the input power supply unit 110, converts the power into the standby power, and applies the standby power to the load 200 such that the standby power is used to drive a receiver of a remote controller and a power button input unit included in the load 200.

When the load 200 is in the standby mode, the power supply 100 turns the first switch 110 to a second state (e.g., off) to block the input power supplied to the load 200 and provides the standby power to the load 200 through discharging of the power-saving power supply unit 130.

In this case, the power-saving power supply unit 130 receives the input power from the input power supply unit 110 on the basis of a voltage of a charging unit (e.g., charger) to charge the charging unit.

The power-saving power supply unit 130 will now be described in detail with reference to FIGS. 2 and 3.

FIG. 2 shows an example of the power-saving power supply unit 130 according to an exemplary embodiment. Referring to FIG. 2, the power-saving power supply unit 130 includes a voltage adjuster 132, a second switch 133, a first power converter 134, a third switch 135, a charging unit 136 (e.g., charger), a booster 137, a voltage detector 138, and a first controller 139.

The voltage adjuster 132 is connected to the power line 131 and adjusts the power of the input power supply unit 110, applied thereto through the power line 131, to a voltage at a predetermined level. Here, the voltage at a predetermined level is a voltage to turn the second switch 133 on.

The voltage adjuster 132 is connected to the second switch 133.

The second switch 133 is turned on or off in response to a control signal transmitted from the first controller 139 and supplies the voltage adjusted by the voltage adjuster 132 to the first power converter 134 when turned on.

More specifically, the second switch 133 is turned on such that the standby power is supplied to the load 200 when the load 200 is in the normal mode.

This is for the purpose of continuously supplying power to drive the receiver for receiving a signal from the remote controller and an input unit for receiving an on signal of a power button even when the load is in the normal mode.

The second switch 133 is turned on or off in response to the voltage of the charging unit 136 when the load 200 is in the standby mode.

The second switch 133 is turned on when the current mode of the load 200 changes to the standby mode, turned on according to a command of the first controller 139 to charge the charging unit 136 when the voltage of the charging unit 136 is discharged to lower than a first reference voltage while the standby power is supplied to the load 200, and turned off according to a command of the first controller 139 when charging of the charging unit 136 is completed.

The second switch 133 is connected to the first power converter 134.

The first power converter 134 converts the power supplied through the second switch 133 to a power at a predetermined level. Here, the power at the predetermined level is power suitable to charge the charging unit 135. The power at the predetermined level corresponds to the standby power.

The first power converter 134 directly applies the power at the predetermined level to the load 200 through a standby power output port 130a or supplies the power at the predetermined level to the charging unit 136.

The first power converter 134 is connected in parallel with the charging unit 136. Accordingly, the first power converter 134 can transmit the power at the predetermined level to the standby power output port 130a or the charging unit 136.

The third switch 135 is arranged between the first power converter 134 and the charging unit 136.

The third switch 135 is connected in parallel with the first power converter 134 and serially connected to the charging unit 136. Thus, the third switch 135 is turned on or off according to a command of the first controller 139 to supply the power at the predetermined level, converted by the first power converter 136, to the charging unit 136 or block the power supplied to the charging unit 136.

The third switch 135 is turned off according to a command of the first controller 139 when the current mode of the load 200 is the normal mode and is turned on or off according to a command of the first controller 139 when the current mode of the load 200 is the standby mode.

The third switch 135 can be turned on when the voltage of the charging unit 136 is discharged to lower than the first reference voltage while the load 200 is in the normal mode.

The third switch 135 is turned on according to a command of the first controller 139 to charge the charging unit 136 when the voltage of the charging unit 136 is discharged to lower than the first reference voltage while the standby power is supplied to the load 200 and turned off according to a command of the first controller 139 upon completion of charging of the charging unit 136.

The charging unit 136 charges the power supplied through the first power converter 134 when the third switch 135 is turned on and discharges the power charged therein when the third switch 135 is turned off. Here, the discharged power is output through the standby power output port 130a and used as the standby power of the load 200.

The charging unit 136 applies driving power to the first controller 139.

That is, the charging unit 136 performs charging when the internal voltage thereof decreases to lower than the first reference voltage and performs discharging when the internal voltage thereof is charged to higher than a second reference voltage.

The booster 137 is arranged between the charging unit 136 and the standby power output port 130a.

The booster 137 converts the voltage of the power discharged from the charging unit 136 into a voltage at a predetermined level. Here, the voltage at the predetermined level corresponds to the standby power.

The booster 137 is a step-up DC-DC converter and boosts the voltage output from the charging unit 136 to a voltage at a predetermined level in order to prevent a voltage lower than a predetermined voltage from being applied to the load due to discharging of the charging unit 136 to restrain the load from performing the standby mode.

The voltage detector 138 detects the voltage of power charged in the charging unit 136 and transmits the detected voltage to the first controller 139.

The first controller 139 receives driving power from the charging unit 136 and controls operations of the second switch 133 and the third switch 135 on the basis of the voltage transmitted from the voltage detector 138.

That is, the first controller 139 controls the second switch 133 to be turned on and controls the third switch 135 to be turned off when the load 200 is in the normal mode.

In addition, the first controller 139 can control the third switch 135 to be turned on when the voltage of the charging unit 136 decreases to lower than the first reference voltage while the load 200 is in the normal mode.

The first controller 139 converts an on/off state of the second switch 133 and the third switch 135 on the basis of the voltage of the charging unit 136 when the load 200 is in the standby mode.

In this case, the first controller 139 compares the voltage detected by the voltage detector 138 with the first reference voltage while controlling the second switch 133 and the third switch 135 to be turned off and controls the second switch 133 and the third switch 135 to be turned on when the detected voltage is lower than the first reference voltage. Furthermore, the first controller 139 compares the voltage detected by the voltage detector 138 with the second reference voltage while controlling the second switch 133 and the third switch 135 to be turned on and controls the second switch 133 and the third switch 135 to be turned off when the detected voltage is higher than the second reference voltage. Here, the first reference voltage and the second reference voltages are predetermined.

In the present exemplary embodiment, the power-saving power supply unit 130 directly supplies the power converted by the first power converter 134 to the load 200 as standby power while maintaining the second switch 133 in an on state when the load 200 is in the normal mode and provides the power charged in the charging unit 136 to the load 200 as standby power while converting an on/off state of the second switch 133 and the third switch 135 on the basis of the voltage of the charging unit 136 when the load is in the standby mode.

In addition, the power-saving power supply unit 130 may turn the third switch 135 on such that power is charged in the charging unit 136 if the voltage of the charging unit 136 is lower than the first reference voltage when the load is in the normal mode.

FIG. 3 shows an example of the power-saving power supply unit 130 according to another exemplary embodiment. Referring to FIG. 3, the power-saving power supply unit 130 includes the voltage adjuster 132, the second switch 133, the first power converter 134, the third switch 135, the charging unit 136 (e.g., charger), the booster 137, the voltage detector 138, and the first controller 139.

The voltage adjuster 132 corresponds to the voltage adjuster 132 shown in FIG. 2 so that a redundant explanation thereof is omitted herein.

The second switch 133 is turned on or off in response to a control signal transmitted from the first controller 139 and supplies the voltage adjusted by the voltage adjuster 132 to the first power converter 134 when turned on.

The second switch 133 is turned on when the load 200 is in the normal mode and turned on or off when the load 200 is in the standby mode.

The second switch 133 is turned on according to a command of the first controller 139 for charging of the charging unit 136 when the voltage of the charging unit 136 is discharged to lower than the first reference voltage while the standby power is supplied to the load 200, and turned off according to a command of the first controller 139 when charging of the charging unit 136 is completed.

The second switch 133 is connected to the first power converter 134.

The first power converter 134 converts the power supplied through the second switch 133 to power at a predetermined level and applies the converted power to the charging unit 136. Here, the power at the predetermined level is power suitable to charge the charging unit 135.

The first power converter 134 is serially connected to the charging unit 136.

The power-saving power supply unit 130 may further include the third switch 135. In this case, the third switch 135 is arranged between the first power converter 134 and the charging unit 136 and is turned on/off in the same manner as the second switch 133.

The charging unit 136 supplies power to drive the first controller 139 and provides standby power to the load.

The charging unit 136 charges the power supplied through the first power converter 134 when the second switch 133 is turned on and discharges the power charged therein when the second switch 133 is turned off. Here, the discharged power is used as standby power of the load 200.

That is, the charging unit 136 performs charging when the internal voltage thereof decreases to lower than the first reference voltage and performs discharging when the internal voltage thereof is charged to higher than the second reference voltage.

The booster 137 is arranged between the charging unit 136 and the standby power output port 130*a*. The booster 137 corresponds to the booster 137 shown in FIG. 2 so that a redundant explanation thereof is omitted herein.

The voltage detector 138 detects the voltage of power charged in the charging unit 136 and transmits the detected voltage to the first controller 139.

The first controller 139 controls an operation of the second switch 133 on the basis of the voltage detected by the voltage detector 138.

More specifically, the first controller 139 controls the second switch 133 to be turned on when the load 200 is in the normal mode. The first controller 139 may convert an on/off state of the second switch 133 on the basis of the voltage of the charging unit 136 when the current mode of the load 200 is the normal mode.

The first controller 139 converts an on/off state of the second switch 133 when the current mode of the load is the standby mode.

In this case, the first controller 139 compares the voltage detected by the voltage detector 138 with the first reference voltage while controlling the second switch 133 to be turned off and controls the second switch 133 to be turned on when the detected voltage is lower than the first reference voltage. Furthermore, the first controller 139 compares the voltage detected by the voltage detector 138 with the second reference voltage while controlling the second switch 133 to be turned on and controls the second switch 133 to be turned off when the detected voltage is higher than the second reference voltage. Here, the first reference voltage and the second reference voltage are predetermined.

In the present exemplary embodiment, the power-saving power supply unit 130 supplies the power charged in the charging unit 136 to the load 200 as standby power while maintaining the second switch 133 in an on state when the load 200 is in the normal mode and provides the power charged in the charging unit 136 to the load 200 as standby power while converting on/off of the second switch 133 when the load 200 is in the standby mode.

In addition, the power-saving power supply unit 130 may supply the power charged in the charging unit 136 to the load 200 as standby power while converting an on/off state of the second switch 133 in both the normal mode and the standby mode of the load 200.

Figure 4:
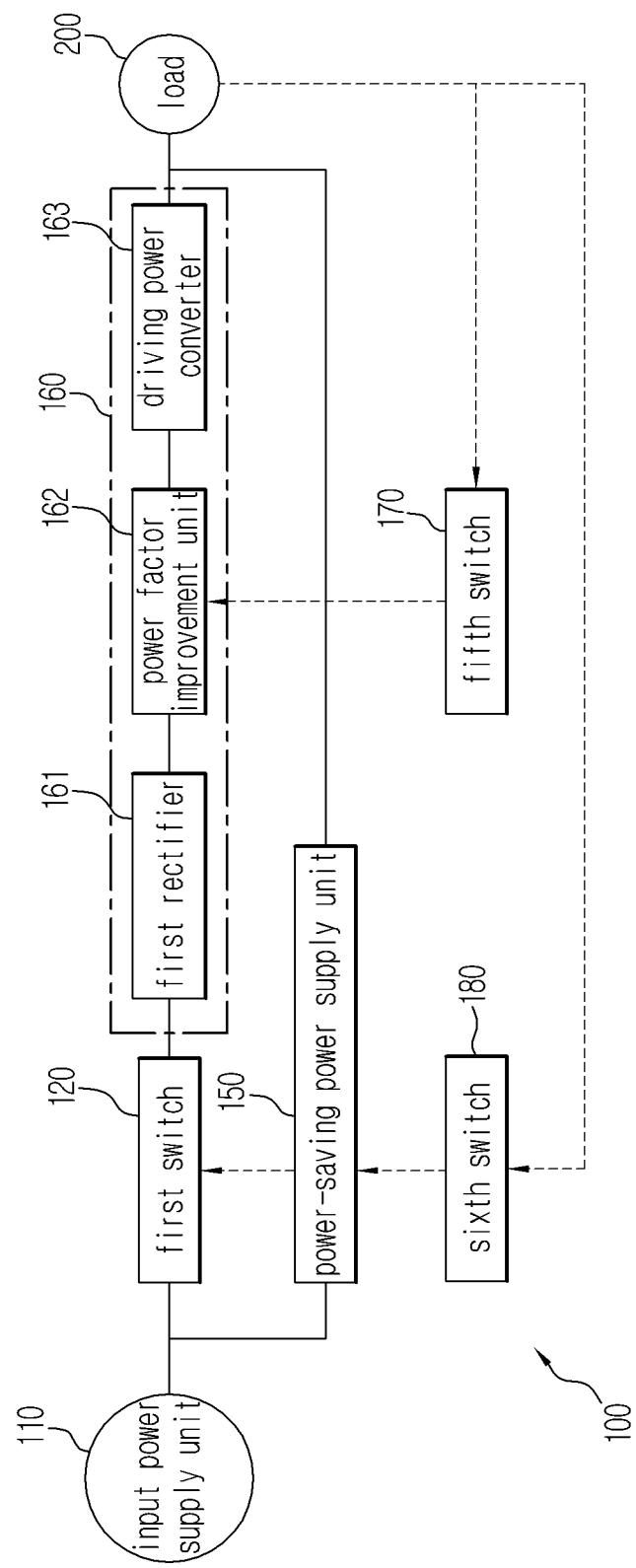
FIG. 4 shows a configuration of a power supply according to another exemplary embodiment.
Figure 5:
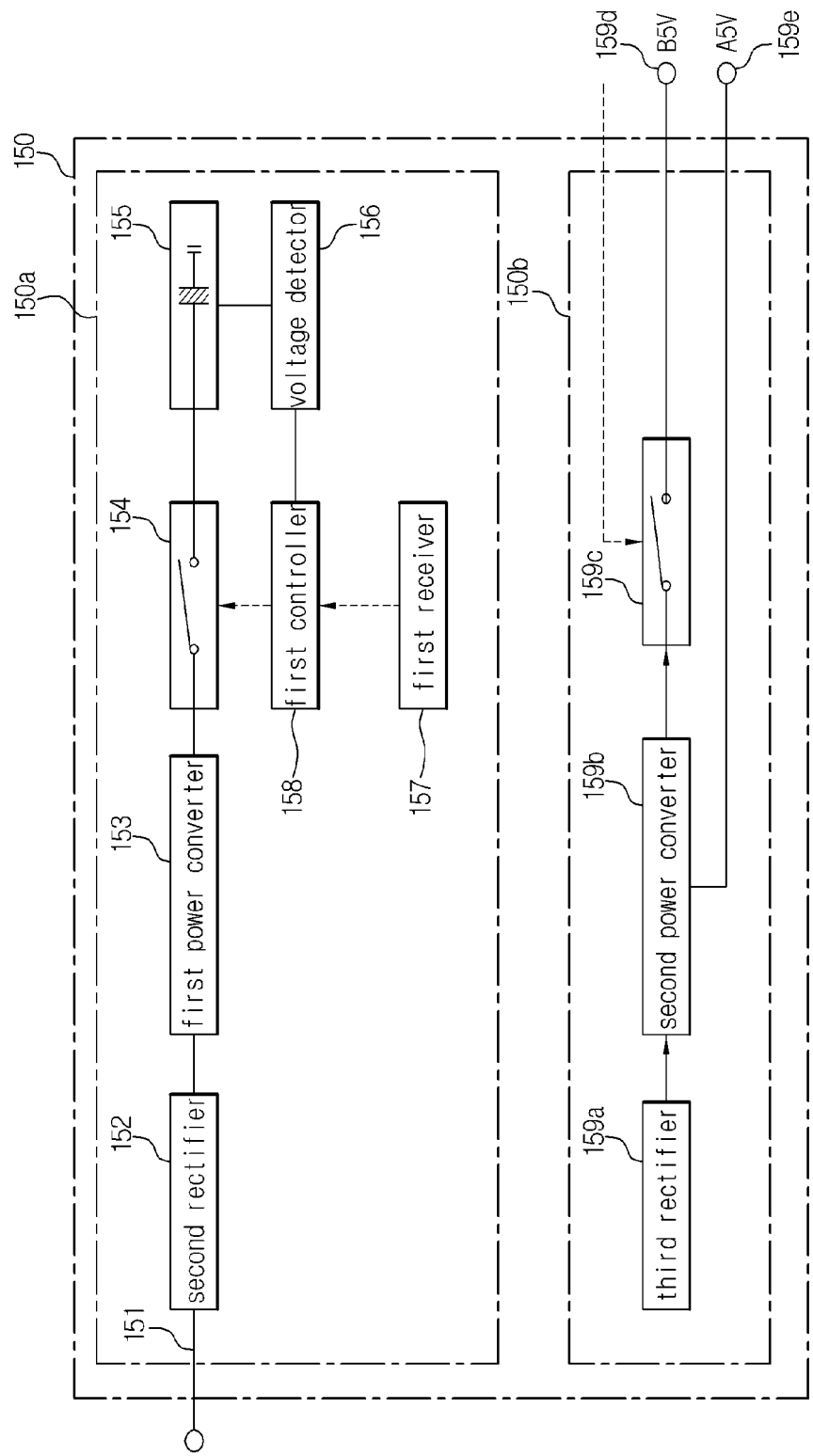
FIG. 5 shows a configuration of a power-saving power supply unit included in the power supply shown in FIG. 4.

FIG. 4 shows a configuration of a power supply 100 according to another exemplary embodiment and FIG. 5 shows a configuration of a power-saving power supply unit 150 included in the power supply 100 shown in FIG. 4, according to an exemplary embodiment.

The power supply 100 according to the present exemplary embodiment is provided to an electric device and supplies driving power or standby power to each load in the electric device. The power supply 100 supplies the driving power to a load when the load is in the normal mode, provides the standby power to a second receiver of a remote controller, included in the load, when the load is in a sleep mode corresponding to a standby mode, and supplies the standby power only to a first receiver of the remote controller, included in the power supply, when the load is in a deep sleep mode corresponding to a standby mode.

As shown in FIG. 4, the power supply 100 includes the input power supply unit 110 (e.g., input power supplier), the first switch 120, a power-saving power supply unit 150 (e.g., power-saving power supplier), and a driving power supply unit 160 (e.g., driving power supplier).

The input power supply unit 110 is connected to an external commercial power supply to receive power from the external commercial power supply and supplies the received power to at least one of the power-saving power supply unit 150 and the driving power supply unit 160.

The input power supply unit 110 includes a plug (not shown) and the plug has two power ports (Live and Neutral) and a prime ground port FG.

The first switch 120 is arranged between the input power supply unit 110 and the load 200 and is turned on or off according to a command of a first controller 158.

The first switch 120 is turned on according to a command of the first controller 158 when the load 200 is in the normal mode.

The first switch 120 is turned on according to a command of the first controller 158 when the standby mode of the load 200 corresponds to a first standby mode (e.g., sleep mode) and turned off according to a command of the first controller 158 when the standby mode of the load 200 corresponds to a second standby mode (e.g., deep sleep mode).

The first switch 120 supplies the power of the input power supply unit 110 to the load 200 when the standby mode of the load 200 corresponds to the sleep mode and blocks the input power when the standby mode of the load 200 corresponds to the deep sleep mode.

Accordingly, the first switch 120 can allow the power of the input power supply source unit 110 to be supplied to the driving power supply unit 160 when the load 200 is in the normal mode, permit the power of the input power supply source unit 110 to be provided to a second standby power unit 150*b* when the load 200 is in the sleep mode, and permit the power of the input power supply source unit 110 to be provided to a first standby power unit 150*a* when the load 200 is in the deep sleep mode.

The first switch 120 may include a relay.

The power-saving power supply unit 150 provides standby power to at least one of a first receiver 157 and a second receiver 212 (shown in FIG. 7) for receiving a signal of the remote controller when the load 200 is in the standby mode.

The power-saving power supply unit 150 according to an exemplary embodiment will now be described in detail with reference to FIG. 5.

As shown in FIG. 5, the power-saving power supply unit 150 includes the first standby power unit 150*a* (e.g., first standby power supplier) and the second standby power unit 150*b* (e.g., second standby power supplier).

The first standby power unit 150*a* is connected to the power line 151 branched from a point between the input power supply unit 110 and the first switch 120 and receives the power from the input power supply unit 110 through the power line 151.

That is, the first standby power unit 150*a* can receive the power from the input power supply unit 110 regardless of an on/off state of the first switch 120.

The first standby power unit 150*a* performs only a charging operation of a charging unit 155 on the basis of the voltage of the charging unit 155 when the load 200 is in the normal mode and the sleep mode.

The first standby power unit 150*a* charges and discharges the power supplied from the input power supply unit 110 to provide standby power to the first receiver 157 and the first controller 158 when the standby mode of the load 200 is the deep sleep mode. Here, the discharged power is used as standby power to receive a signal from the remote controller.

The first standby power unit 150*a* can reduce power consumption due to power conversion because the first standby power unit 150*a* converts the power of the input power supply unit 110 to power suitable for charging of the charging unit 155 only during charging of the charging unit 155 when the standby power is supplied to the first receiver.

The second standby power unit 150*b* blocks supply of the input power when the standby mode is the deep sleep mode. The second standby power unit 150*b* receives the input power through the first switch 120, converts the input power into standby power, and supplies the standby power to the second receiver 212 when the standby mode corresponds to the sleep mode.

Here, the sleep mode and the deep sleep mode may be set according to user selection or update.

More specifically, the first standby power unit 150*a* includes a second rectifier 152, a first power converter 153, a second switch 154, the charging unit 155 (e.g., charger), a voltage detector 156, the first receiver 157, and the first controller 158.

The second rectifier 152 is connected to the power line 151 branched from a point between the input power supply unit 110 and the first switch 120.

That is, the second rectifier 12 is arranged between the power line 151 branched from the input power supply unit 110 and the charging unit 155 and rectifies the power supplied to the charging unit 155 from the input power supply unit 110. The second rectifier 152 may include a diode.

The first power converter 153 is arranged between the second rectifier 152 and the charging unit 155 and converts the voltage of power supplied to the charging unit 155 from the second rectifier 152.

The first power converter 153 converts the voltage of the rectified power to a voltage suitable to charge the charging unit 155. The first power converter 153 may include a DC-DC converter for charging.

The second switch 154 is located between the first power converter 153 and the charging unit 155 and is turned on or off according to a command of the first controller 158.

That is, the second switch 154 is turned on when the voltage of the charging unit 155 is lower than the first reference voltage and is turned off when the voltage of the charging unit 155 becomes higher than the second reference voltage to fully charge the charging unit 155.

The charging unit 155 is connected to the second switch 154 and supplies power to drive the first controller 158, the first receiver 157, and the voltage detector 156 when the standby mode is the deep sleep mode. Here, the power to drive the first controller 158, the first receiver 157 and the voltage detector 156 corresponds to standby power used to wait to receive a signal from the remote controller.

The charging unit 155 may include a super capacitor, provides the power charged therein to the first controller 158, the first receiver 157, and the voltage detector 156 in the deep sleep mode, and performs charging when discharged to lower than the first reference voltage.

Here, the super capacitor has enhanced capacitance performance and is used as a cell. Accordingly, the super capacitor can stably operate for a long time in an environment in which charging and discharging are repeated.

The super capacitor receives power from the input power supply unit 110, charges the received power, and discharges the charged power when power is not applied thereto.

The voltage detector 156 is arranged across both terminals of the charging unit 155, detects the voltage of power charged in the charging unit 155, and transmits the detected voltage to the first controller 158.

The first receiver 157 receives the driving power from the charging unit 155 in the deep sleep mode and waits to receive a signal transmitted from the remote controller in the standby mode. When an on signal is received from the remote controller, the first receiver 157 transmits the on signal to the first controller 158. When an off signal is received from the remote controller, the first receiver 157 transmits the off signal to the first controller 158.

The first receiver 157 can be maintained in an inactivated state in the sleep mode and the normal mode. The first receiver 157 can switch to an activated state according to a command of the first controller 158.

The first controller 158 receives driving power from the charging unit 155.

The first controller 158 controls the first switch 120 to be turned on in the normal mode, controls the first switch 120 to be turned on in the sleep mode, and controls the first switch 120 to be turned off in the deep sleep mode.

The first controller 158 compares the voltage of the charging unit 155 with the first reference voltage, controls the second switch 154 to be turned on when the voltage of the charging unit 155 is lower than the first reference voltage, and controls the second switch 154 to be turned off when the voltage of the charging unit 155 is higher than the first reference voltage.

In addition, the first controller 158 controls the second switch 154 to be turned on until the voltage of the charging unit 155 exceeds the second reference voltage if the charging unit 155 has been charged.

The first controller 158 is a microcomputer that consumes ultra low power. Thus, the first controller 158 consumes a minimum amount of power charged in the charging unit 155 corresponding to a super capacitor.

That is, the electric device including the power supply 100 consumes only power for a charging operation of the charging unit 155 when the electric device is in the deep sleep mode as a standby mode. Accordingly, it is possible to make the standby power zero.

The second standby power unit 150b includes a third rectifier 159a, a second power converter 159b, and a fourth switch 159c.

The third rectifier 159a is connected to the first switch 120 and rectifies the power of the input power supply unit 110, applied thereto through the first switch 120, when the first switch 120 is turned on. The third rectifier 159a may include a diode.

The second power converter 159b is connected to the third rectifier 159a and converts the voltage of power rectified by the third rectifier 159a. The second power converter 159b includes a flyback DC-DC converter.

The second power converter 159b includes a first standby power output port 159d and a second standby power output port 159e and selectively outputs the converted voltage through the first standby power output port 159d and the second standby power output port 159e. The first and second standby power output ports 159d and 159e can be connected to different ports of a second controller 211 which will be described below.

The second power converter 159b outputs a voltage of approximately B5V through the first standby power output port 159d and outputs a voltage of approximately A5V through the second standby power output port 159e.

Standby power output through the first standby power output port 159d is used as driving power of the second receiver 212 in the normal mode or is used as a signal for switching the deep sleep mode to the normal mode in the deep sleep mode.

Standby power output through the second standby power output port 159e is used as standby power of the second receiver 212 in the sleep mode.

The fourth switch 159c is connected to the first standby power output port 159d.

The fourth switch 159c is turned on by power fed back according to a command of the second controller 211. The fourth switch 159c supplies the standby power converted by the second power converter 159b to the second receiver 212 of the load 200. The fourth switch 159c may include a relay.

In addition, the second power converter 159b can block the standby power output from the second standby power output port 159e when the fourth switch 159c is turned on and thus standby power is supplied to the load 200 through the first standby power output port 159d.

That is, the first standby power unit 150a of the power-saving power supply unit 150 generates the standby power for driving the first receiver using the input power while operations of the load 200 are all stopped, and the second standby power unit 150b of the power-saving power supply unit 150 converts the input power applied through the first switch 120 in order to drive only the second receiver of the load 200 to thereby generate standby power.

The driving power supply unit 160 receives the power of the input power supply unit 110 through the first switch 120, converts the received power into power to drive the load 200, and applies the driving power to the load 200.

The driving power supply unit 160 includes a first rectifier 161, a power factor improvement unit 162 (e.g., power factor improver), and a driving power converter 163.

The first rectifier 161 is connected to the first switch 120 and rectifies the power of the input power supply unit 110, applied through the first switch 120 when the first switch 120 is turned on. The first rectifier 161 may include a bridge diode and full-wave-rectifies the input power through the bridge diode.

The first rectifier 161 is connected in parallel between the third rectifier 159a and the first switch 120.

The first rectifier 161 is connected to the power factor improvement unit 162.

The power factor improvement unit 162 is located between the first rectifier 161 and the driving power converter 163. The power factor improvement unit 162 operates according to a command of the second controller 211 of the load 200.

The power factor improvement unit 162 can be implemented by a switch corresponding to an active element.

That is, the power factor improvement unit 162 operates when power is applied thereto through the fifth switch 170. Accordingly, the power rectified by the first rectifier 161 is supplied to the driving power converter 163 through the power factor improvement unit 162. In this case, the power factor improvement unit 162 improves the power factor of the power rectified by the first rectifier 161 by correcting the power factor.

The power factor improvement unit 162 is connected to the driving power converter 163.

The driving power converter 163 converts the power with the improved power factor. The driving power converter 163 may include an LLC DC-DC converter.

A driving power output port of the driving power converter 163 is connected to the load 200.

That is, a voltage to drive various loads is output through the driving power output port of the driving power converter 163.

The fifth switch 170 is located between the second controller 211 of the load 200 and the power factor improvement unit 162.

The fifth switch 170 is turned on by power fed back according to a command of the second controller 211 of the load 200. The fifth switch 170 may include a photo-coupler Power output through the fifth switch 170 when the fifth switch 170 is turned on is applied to the power factor improvement unit 162.

The sixth switch 180 is located between the first controller 158 and the second controller 211.

The sixth switch 180 is turned on according to a command of the second controller 211. The sixth switch 180 may include a photo-coupler.

When the sixth switch 180 is turned on, the command of the second controller 211 is transmitted to the first controller 158. That is, the sixth switch 180 is turned on in the normal mode and the sleep mode and turned off in the deep sleep mode.

Figure 6:
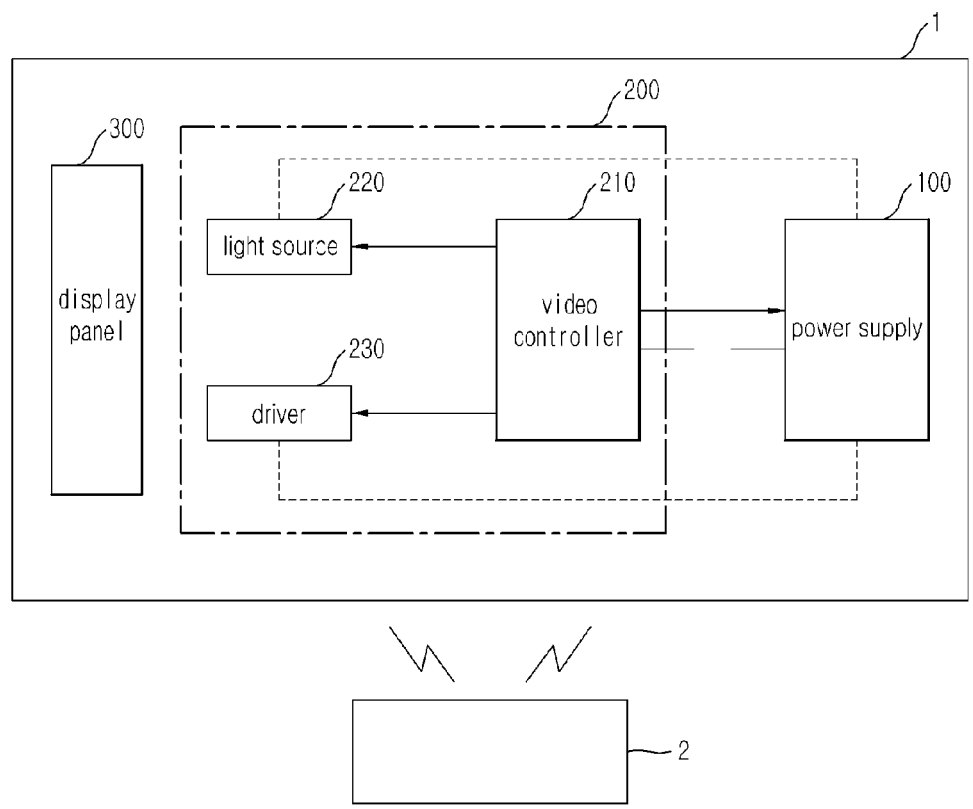
FIG. 6 is a block diagram of a display apparatus according to another exemplary embodiment.

FIG. 6 shows a configuration of an electric device including the power supply 100 according to another exemplary embodiment. The electric device is described with reference to FIGS. 7 and 8.

Figure 7:
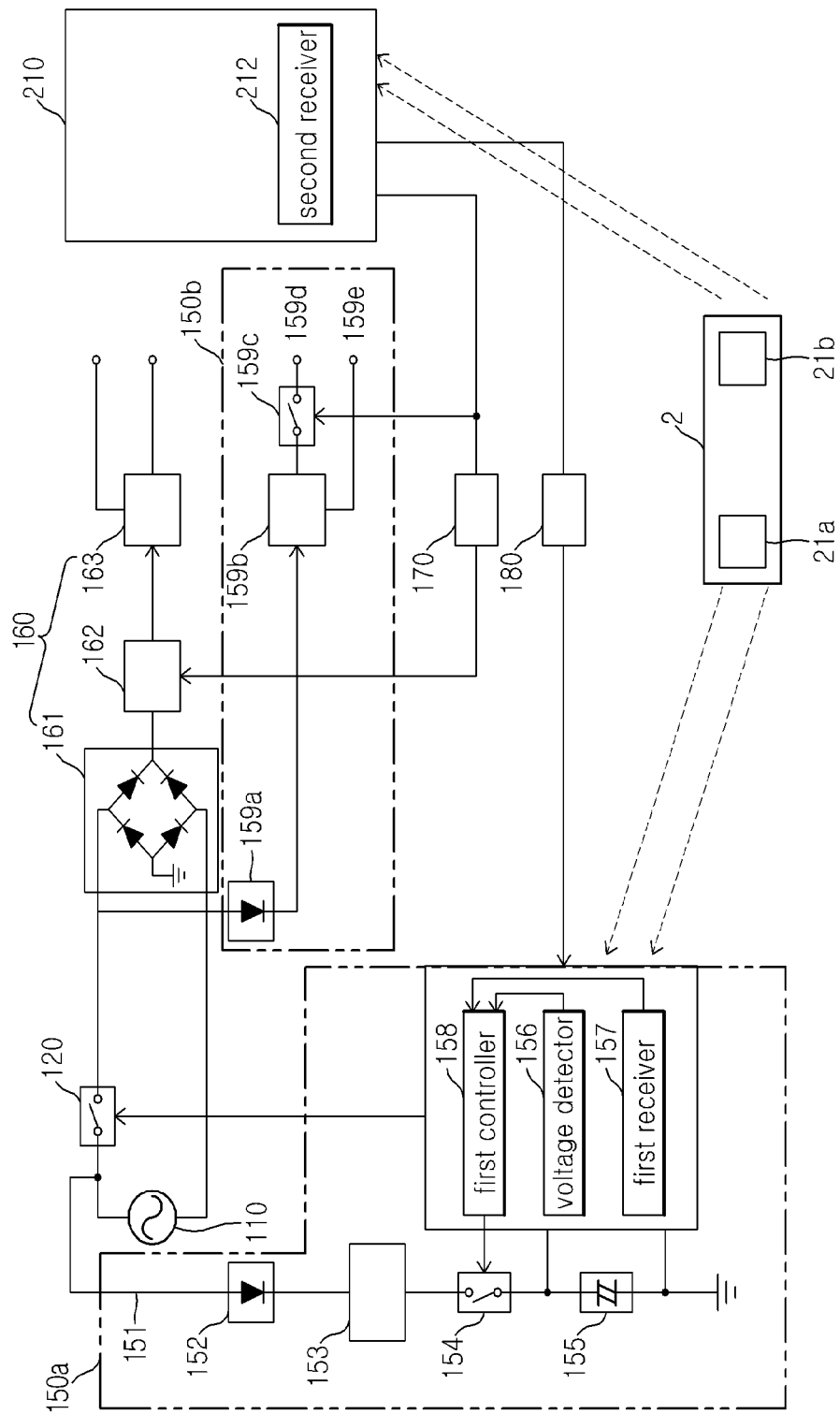
FIG. 7 shows a configuration of a power supply included in the display apparatus shown in FIG. 6.
Figure 8:
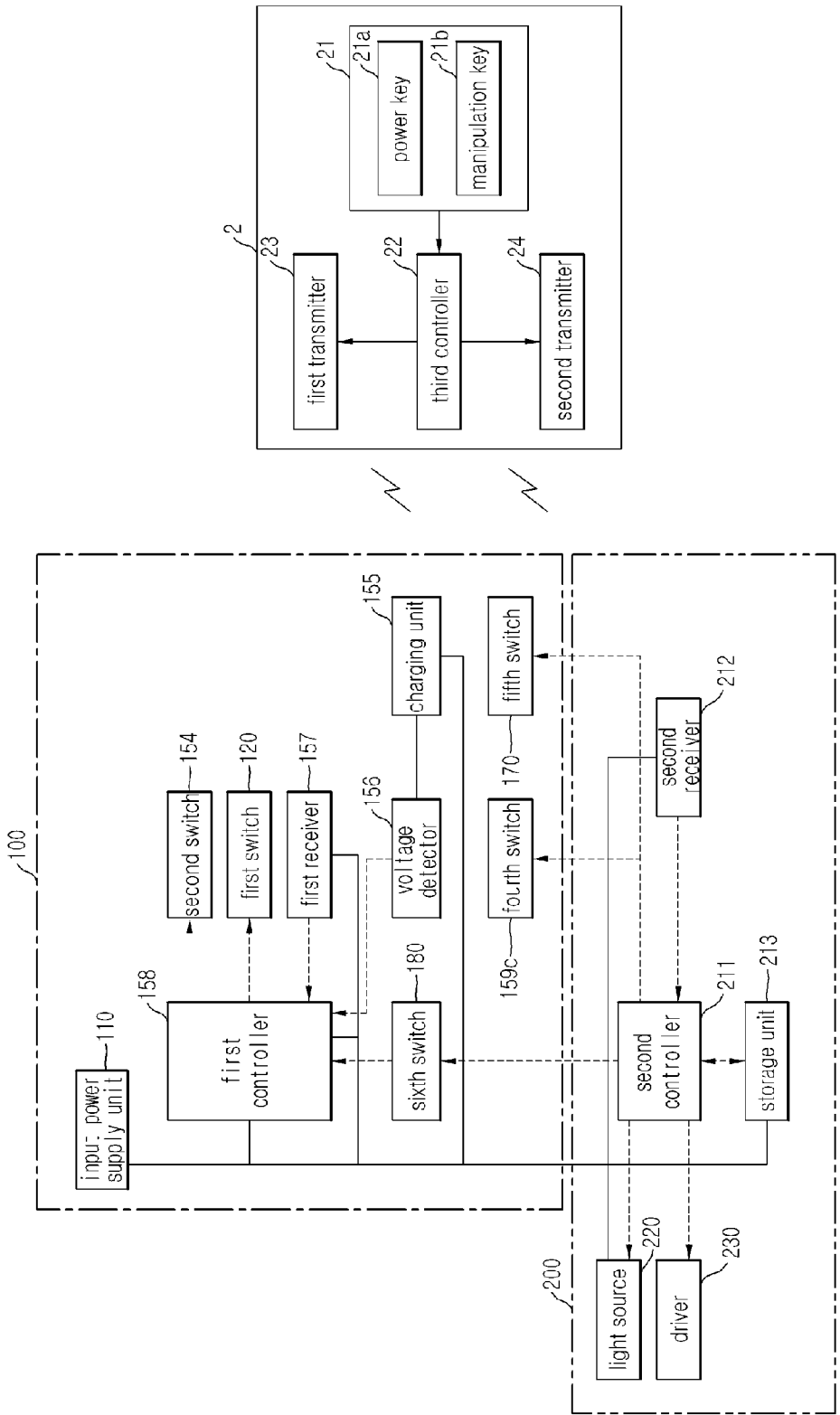
FIG. 8 shows a configuration of a display apparatus and a remote controller according to another exemplary embodiment.

FIG. 7 shows a configuration of a display apparatus 1 and a remote controller 2 including the power supply 100 shown in FIG. 6 and FIG. 8 shows a configuration of the power supply 100 shown in FIG. 6 according to one or more exemplary embodiments.

The electric device in the present exemplary embodiment is a display apparatus 1 and includes a TV receiver, a projector, a monitor, etc. However, it is understood that one or more other exemplary embodiments are not limited to a display apparatus 1 as the electric device.

Referring to FIG. 6, a display apparatus 1 displaying images receives a power on/off command and a driving command from a remote controller 2.

That is, a user can turn the display apparatus 1 on or off and operate the turned on display apparatus 1 by manipulating the remote controller 2.

The display apparatus 1 displays an image upon receiving a power on command from the remote controller 2 in the normal mode, and blocks power supplied to a load 200 to interrupt display of an image and performs a standby mode upon receiving a power off command from the remote controller 2.

Here, the standby mode includes the deep sleep mode that uses input power as standby power and the sleep mode that uses converted input power as standby power.

Standby power in the deep sleep mode is lower than standby power in the sleep mode.

The display apparatus 1 performs the sleep mode as a standby mode when there is a possibility that data is received or there is a possibility of update. In this case, the sleep mode and the deep sleep mode can be selected by a user.

When the user selects the sleep mode as a standby mode and a data receiving command is received, the display apparatus 1 drives a load 200 from among a plurality of loads by supplying driving power to the load 200 according to a command of the second controller 211 so as to store data received from an external device.

The display apparatus 1 includes the power supply 100 that supplies driving power or standby power, the load 200 driven using the driving power supplied from the power supply 100, and a display panel 300 that displays an image according to operation of the load 200.

The power supply 100 supplies the driving power to each load in the normal mode in which the display apparatus 1 displays an image. When a power off command for each load is received when the power supply 100 is connected to a commercial power supply, the power supply 100 provides only standby power used to wait to receive an on signal of the remote controller 2.

The power supply 100 determines whether the standby mode set to the display apparatus 1 is the sleep mode or the deep sleep mode, turns the first switch 120 on or off on the basis of the determination result, and activates the first standby power unit 150a or the second standby power unit 150b according to the set standby mode.

Referring to FIG. 7, the power supply 100 includes an input power supply unit 110 (e.g., input power supplier), the first switch 120, the power-saving power supply unit 150 (e.g., power-saving power supplier), and the driving power supply unit 160 (e.g., driving power supplier). The power supply corresponds to the power supply shown in FIGS. 4 and 5 so that a redundant explanation thereof is omitted herein.

The display apparatus 1 including the aforementioned power supply 100 uses a voltage output through the second standby power output port 159e of the second power converter 159b as standby power in the sleep mode and uses the voltage of the charging unit 155 as standby power while power supplied to the load 200 is blocked in the deep sleep mode. Accordingly, it is possible to make the standby power zero.

Configurations of the power supply 100, the load 200, and the remote controller 2 of the display apparatus 1 according to an exemplary embodiment will now be described with reference to FIG. 8.

The charging unit 155 is connected to the input power supply unit 110, provides driving power to the first controller 158, the first receiver 157, and the voltage detector 156 in the deep sleep mode corresponding to a standby mode, and performs charging when the voltage thereof becomes lower than the first reference voltage.

The driving power is standby power used when the display apparatus 1 waits to receive a signal from the remote controller.

The voltage detector 156 detects the voltage of power charged in the charging unit 155 and transmits the detected voltage to the first controller 158.

The first receiver receives a power on or off signal of the load 200 from the remote controller 2.

The first receiver 157 may have a code different from a signal received by the second receiver 212.

The first receiver 157 is in a standby state in the deep sleep mode and thus the first receiver 157 can receive a signal from the remote controller 2, whereas the second receiver 212 is not driven in the deep sleep mode and thus the second receiver 212 cannot receive a signal from the remote controller 2.

The first receiver 157 is inactivated under the control of the first controller 158 in the normal mode and the sleep mode or ignores a signal of the remote controller 2. The second receiver 212 receives a signal of the remote controller 2 in the normal mode and the sleep mode.

In addition, both the first receiver 157 and the second receiver 212 can receive a signal of the remote controller 2 in the normal mode and the sleep mode.

The first controller 158 receives the voltage of the charging unit 155, detected by the voltage detector 156, in the normal mode, the sleep mode, and the deep sleep mode.

The first controller 158 periodically compares the voltage of the charging unit 155 with the first reference voltage, turns the second switch 154 on when the voltage of the charging unit 155 is lower than the first reference voltage, and turns the second switch 154 off when the voltage of the charging unit 155 is higher than the second reference voltage.

The first controller 158 determines whether the voltage charged in the charging unit 155 corresponds to the predetermined second reference voltage while controlling charging of the charging unit 155 and turns the second switch 154 off when the voltage charged in the charging unit 155 is higher than the second reference voltage.

The first controller 158 switches the current mode to the normal mode upon receiving an on signal of the remote controller 2 through the first receiver 157 and switches the current mode to the standby mode upon receiving an off signal of the remote controller 2.

The first controller 158 controls an on/off state of the first switch 120 on the basis of a control signal of the second controller 211, transmitted through the sixth switch 180.

That is, when the current mode switches to the standby mode, the first controller 158 controls the first switch 120 to be turned on when a sleep mode command is transmitted from the second controller 211 and controls the first switch 120 to be turned off when a deep sleep mode command is transmitted from the second controller 211.

The first controller 158 is electrically separated from the sixth switch 180 when controlling the standby mode to switch to the deep sleep mode and is electrically connected to the sixth switch 180 when controlling the current mode to switch to the normal mode and the sleep mode.

That is, the first controller 158 can determine that the current mode is the deep sleep mode upon determining that both the first switch 120 and the sixth switch 180 are turned off.

Furthermore, the first controller 158 can receive a command for switching the normal mode to the standby mode from the second controller 211. In this case, the first controller 158 controls an on/off state of the first switch 120 on the basis of the mode conversion command.

In addition, the first controller 158 can turn the sixth switch 180 off after the lapse of a predetermined time from when a command for switching the current mode to the standby mode is input.

The first controller 158 includes a microcomputer that consumes ultra low power. Accordingly, the first controller 158 consumes a minimum quantity of power charged in the charging unit 155 corresponding to a super capacitor.

The fourth switch 159c is turned on by power fed back according to a command of the second controller 211 of a video controller 210. When the fourth switch 159c is turned on, power output from the second power converter 159b is applied to the load 200.

The fourth switch 159c supplies power to the second receiver 212 when turned on.

The second power converter 159b outputs a voltage of approximately 5V through a standby power output port. The standby power output port of the second power converter 159b is connected to the load 200 that uses the voltage output through the standby power output port as driving power.

The fifth switch 170 is turned on by power fed back according to a command of the second controller 211 of the video controller 210. The fifth switch 170 drives the power factor improvement unit 162 when turned on.

At this time, the power having a power factor improved by the power factor improvement unit 162 is applied to the driving power converter 163 and converted to driving power by the driving power converter 163, and thus a voltage of about 13V and a voltage to drive a light source 220 may be output through a driving power output port of the driving power converter 163.

The sixth switch 180 is turned on or off according to a command of the second controller 211.

The sixth switch 180 is turned on in the normal mode and the sleep mode and turned off in the deep sleep mode.

When the sixth switch 180 is turned on, a command of the second controller 211 is transmitted to the first controller 158.

In this manner, the display apparatus 1 consumes only power to charge the charging unit 155 in the deep sleep mode. Accordingly, it is possible to make standby power zero.

The load 200 is described in detail with reference to FIG. 8.

The load 200 displays an image on the display panel 300. The load 200 includes the video controller 210, the light source 220, and a driver 230.

The video controller 210 controls the light source 220 and the driver 230 to display an image on the display panel 300 and includes the second controller 211, the second receiver 212, and a storage unit 213 (e.g., storage).

The second controller 211 receives the power converted by the second power converter 159b in the normal mode and controls the fourth and fifth switches 159c and 170 to apply the power converted by the second power converter 159b to the second controller 211 and the second receiver 212 and to supply the power converted by the driving power converter 163 to the driver 230 and the light source 220.

The second controller 211 can switch the sleep mode to the normal mode when an on signal is directly received through the remote controller 2 in the sleep mode.

The second controller 211 determines whether the standby mode stored in the storage unit 213 is the sleep mode or deep sleep mode when standby power is supplied, switches the standby mode to the normal mode when the standby mode stored in the storage unit 213 is the deep sleep mode, and maintains the standby mode when standby mode stored in the storage unit 213 is the sleep mode.

Here, the mode stored in the storage unit 213 corresponds to the sleep mode or deep sleep mode selected in the normal mode right before changed to the standby mode.

When a deep sleep mode or sleep mode selection signal is received through the remote controller 2, the second controller 211 controls the deep sleep mode or sleep mode to be stored.

In addition, the second controller 211 controls a previously stored mode to be deleted.

The deep sleep mode or sleep mode can be selected through a manipulation unit.

The second controller 211 controls the third and fourth switches 135 and 159c to be turned on when switching the standby mode to the normal mode such that the power converted by the second converter 155 and power converted by the third power converter and 180 are supplied to the driver 230 and the light source 220.

The second controller 211 controls the sixth switch 180 to be turned on in the normal mode or sleep mode and transmits a selected deep sleep mode or sleep mode signal to the first controller 211, to thereby turn the first switch 120 on or off.

The second controller 211 can transmit a command signal for inactivating the first receiver 157 to the first controller 158 through the sixth switch 180 when switching the standby mode to the sleep mode.

The image controller 210 may further include a tuner.

Upon reception of a broadcast signal from a broadcasting station or a satellite through the tuner in a wired or wireless manner, the second controller 211 divides the received broadcast signal into a video signal having video data, a sound signal having sound data, and an additional signal having additional data, processes the video signal and the sound signal, and transmits the additional data to a graphical user interface (GUI) supply unit (e.g., GUI supplier). Here, the additional data may include an electronic program guide (EPG). The GUI supply unit generates a graphical user interface (GUI) to be provided to the user.

The second controller 211 may decode an external video signal input from the Internet and output the decoded video signal.

The second controller 211 controls the driver 230 and the light source 220 to display the processed video data on the display panel 300 in the normal mode.

The second controller 211 may control the processed sound signal to be output through a speaker or output to an external device connected through an external output port.

The video controller 210 further includes a communication unit (e.g., communicator). The communication unit may communicate with a neighboring terminal through at least one of infrared communication, ZigBee, radio frequency (RF) communication, and Bluetooth or communicate with a remote terminal using WiFi, etc.

That is, the second controller 211 recognizes a user command on the basis of user manipulation performed on the remote controller 2, controls an operation of the display panel 300 according to the recognized user command, and controls the communication unit to access the Internet upon receiving an Internet request signal through the remote controller 2.

Upon input of standby power from the second power converter 159c, the second controller 211 determines whether the standby mode is the deep sleep mode on the basis of whether input of the standby power is maintained. When the standby mode is the deep sleep mode, the second controller 211 controls the fourth switch 159c and the fifth switch 179 to be turned on such that the deep sleep mode switches to the normal mode. When the standby mode is the sleep mode, the second controller 211 controls off state of the fourth and fifth switches 159c and 170 to be maintained such that the sleep mode is maintained.

The second controller 211 determines that the standby mode is the sleep mode when input of the standby power is maintained and maintains the sleep mode. When the standby power is re-input, the second controller 211 determines that the standby mode is the deep sleep mode and switches the current mode to the normal mode.

The second receiver 212 receives a power off signal and a driving signal from the remote controller 2.

The second receiver 212 receives standby power from the second power converter 159b when the standby mode is controlled to be the sleep mode. That is, the second receiver 212 maintains a standby state to receive the power off signal from the remote controller 2 in the sleep mode.

The second receiver 212 does not operate since power supplied from the second power converter 159b is blocked in the deep sleep mode.

The second receiver 212 receives driving power from the second power converter 159b and receives the power off signal and driving signal from the remote controller 2 in the normal mode.

In this case, the second receiver 212 receives a deep sleep mode or sleep mode selection signal transmitted from the remote controller 2.

The storage unit 213 stores channel information, volume information, and screen configuration information in the normal mode before switching to the standby mode and stores a sleep mode or deep sleep mode selected by the user. The storage unit 213 may be a last memory.

The storage unit 213 stores updated information in the normal mode and the sleep mode.

The light source 220 may include a plurality of light emitting diodes (LEDs), is located at the side of a light guide or behind the light guide, and is driven according to a command of the second controller 211 to output light to the light guide. The light source can be eliminated when the display apparatus 1 can emit light.

The driver 230 includes a first driver for driving an X electrode and a second driver for driving a Y electrode. Here, the X electrode is a source electrode and the Y electrode is a gate electrode.

The first driver and the second driver that respectively transmit driving signals to a data line and a gate line are connected to the second controller 211 and operate according to a command of the second controller 211 to display an image.

The first driver selects a gradation voltage for each data line according to a command of the second controller 211 and transmits the selected gradation voltage to liquid crystal through the data line.

The second driver transmits an on/off signal based on a command of the second controller 211 to a thin film transistor (TFT) corresponding to a switching element through a scan line to turn the TFT on or off.

That is, when the first driver supplies a voltage corresponding to each color, the second driver receives the voltage and applies the voltage to a corresponding pixel.

The data line is connected to a source electrode of the TFT, the scan line is connected to a gate electrode of the TFT, and an indium tin oxide (ITO) pixel electrode is connected to a drain electrode of the TFT. The TFT is turned on when a scan signal is supplied to the scan line to apply a data signal provided through the data line to the pixel electrode.

A predetermined voltage is applied to a common electrode, and thus electric field is generated between the common electrode and the pixel electrode. This electric field changes the tilting angle of liquid crystal interposed between liquid crystal display panels and light transmittance is varied according to the changed tilting angle to display a desired image.

The display panel 300 includes a pair of panels and liquid crystal interposed between the panels.

One of the panels includes a plurality of TFTs arranged in a matrix form and the other panel includes a common electrode made of ITO.

The remote controller 2 according to an exemplary embodiment will now be described in detail with reference to FIG. 8.

The remote controller 2 is remotely located from the display apparatus 1.

The remote controller 2 is wirelessly connected to the display apparatus 1 and manipulated by the user to transmit a driving on/off signal and a driving control signal to the display apparatus 1.

An input unit 21 of the remote controller 2 is manipulated by the user and transmits a manipulated signal to a third controller 22. The input unit 21 includes a power key 21a by which the user powers the display apparatus 1 on or off and a manipulation key 21b for controlling operation of the display apparatus 1 and transmits signals respectively corresponding to the power key 21a and manipulation key 21b to the third controller 22.

The power key 21a may include two keys. One is a key for canceling the deep sleep mode and the other is a key for canceling the sleep mode.

The sleep mode or deep sleep mode is selected through the input unit 21.

The third controller 22 controls a first transmitter 23 to transmit an on/off signal of the power key 21a, received from the input unit 21.

When there are two power keys, codes respectively corresponding to the power keys are generated.

The third controller 22 generates a code corresponding to a manipulation signal of the manipulation key 21b, transmitted from the input unit 21, and controls the second transmitter 24 to transmit a driving control signal including the generated code.

The third controller 22 controls a signal corresponding to the selected sleep mode or deep sleep mode to be transmitted.

The first transmitter 23 and the second transmitter 24 may include a light generator or an RF generator and transmits a signal including a code corresponding to an instruction of the third controller 22.

The first transmitter 23 transmits a signal representing conversion to the normal mode or conversion to the deep sleep mode. In this case, the signal of the first transmitter 23 is received by the first receiver 157.

The second transmitter 24 transmits a signal representing conversion to the normal mode or conversion to the sleep mode and transmits a driving control signal in the normal mode.

The second transmitter 24 transmits a signal corresponding to the sleep mode or deep sleep mode.

In this case, the signal of the second transmitter 24 is received by the second receiver 212.

Operations of the power supply 100 and the load 200 according to a signal transmitted from the remote controller 2, according to an exemplary embodiment, will now be described with reference to FIGS. 9 to 12.

Figure 9:
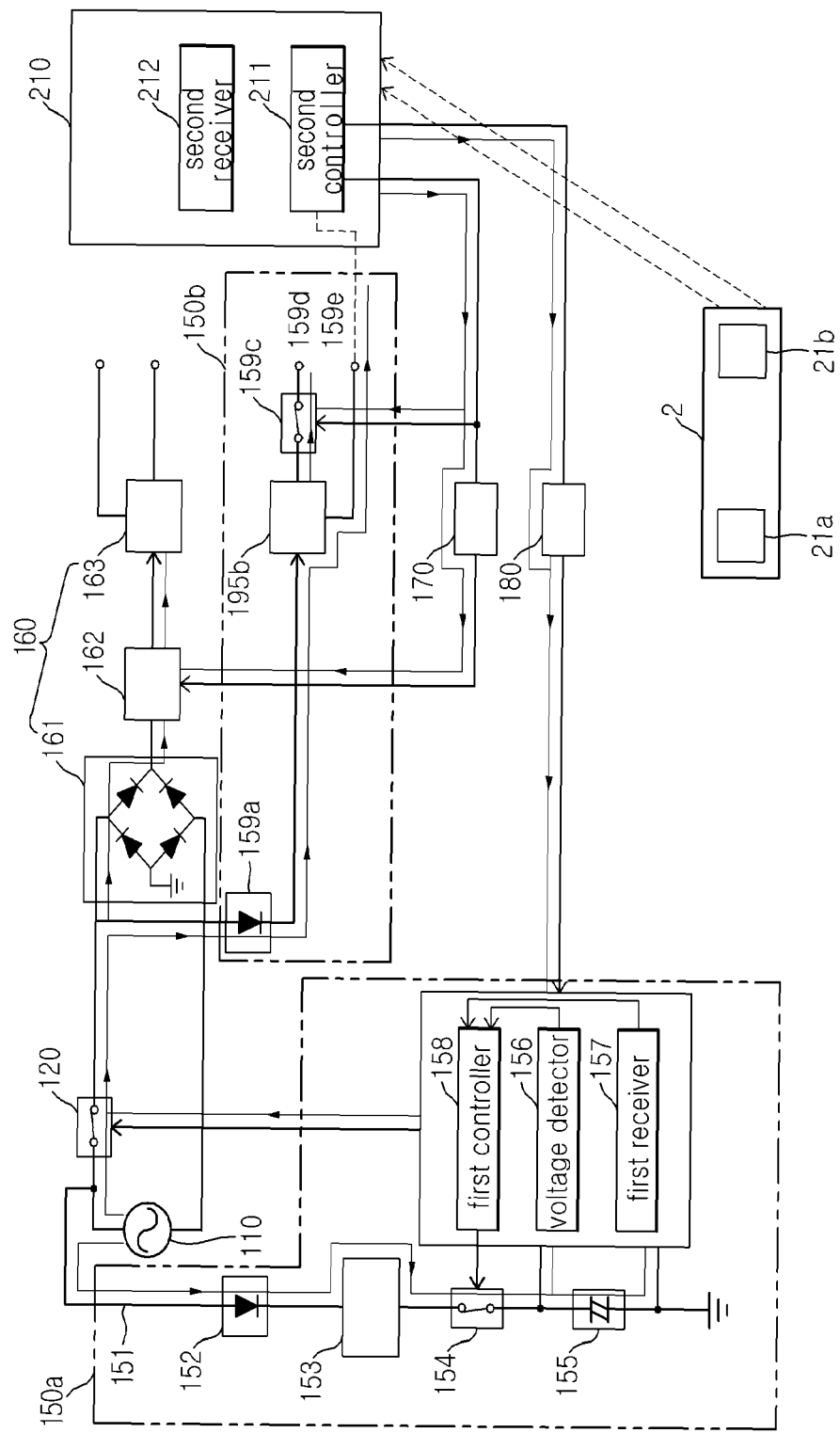
FIG. 9 shows driving power flow of the power supply in a normal mode of the display apparatus shown in FIG. 8.

FIG. 9 illustrates a driving power flow between the power supply 100 and the load 2 when the display apparatus 1 operates in the normal mode, according to an exemplary embodiment.

An example of switching the mode of the display apparatus 1 from the deep sleep mode to the normal mode is described herein.

The power supply 100 switches the current mode of the display apparatus 1 from the standby mode to the normal mode when an on signal is input through the remote controller 2. Here, the power supply 100 turns the first switch 120 on.

AC power of the input power supply unit 110 is applied to the second rectifier 152 regardless of the on state of the first switch 120, and the AC power applied to the second rectifier 152 is rectified and then output to the first power converter 153. The power applied to the first power converter 153 is converted to power for charging and then output to the charging unit 155.

Here, if the charging unit 155 has been fully charged, the second switch 154 is turned off. When the charging unit 155 is discharged, the second switch 154 is turned on such that the power converted by the first power converter 153 is applied to the charging unit 155.

The first receiver 157 and the first controller 158 are driven by the power supplied from the charging unit 155. The first controller 158 driven by the power of the charging unit 155 maintains the first switch 120 in an on state.

That is, the first standby power unit 150a performs charging and discharging of the charging unit 155 to provide driving power to each component.

Then, the first switch 120 is turned on such that the AC power of the input power supply unit 110 is applied to the first and third rectifiers 161 and 159a via the first switch 120.

The third rectifier 159a rectifies the input AC power and outputs the rectified power to the second power converter 159b.

The second power converter 159b converts the rectified power to power at a predetermined level and outputs the converted power to the second controller 211 through the second standby power output port 159d. Here, the second standby power output port 159d of the second power converter 159b is electrically connected to the second controller 211.

Upon supply of power through the second standby power output port 159d of the second power converter 159d, the second controller 211 checks the mode stored in the storage unit 213 and determines whether the mode is a deep sleep mode. When the mode is the deep sleep mode, the second controller 211 turns the fourth and fifth switches 159c and 170 on.

Accordingly, the power converted by the second power converter 159b is output through the first standby power output port 159d and the power factor improvement unit 162 is driven.

When the power factor improvement unit 162 is driven, the first rectifier 161 and the driving power converter 163 can be electrically connected to each other.

That is, the first rectifier 161 rectifies the AC power of the input power supply unit 110 to convert the AC power to DC power.

Since the first rectifier 161 and the driving power converter 163 are electrically connected to each other, the power factor of the power rectified by the first rectifier 161 is corrected by the power factor improvement unit 162 and then the power is output to the driving power converter 163.

The driving power converter 163 converts the power with the improved power factor to power at a predetermined level and supplies the converted power to the load 200. That is, the output port of the driving power converter 163 is connected to various loads.

The second controller 211 turns the sixth switch 180 on to communicate with the first controller 158. In addition, the second controller 211 turns the sixth switch 180 on when the sleep mode is selected.

In this manner, the second standby power unit 150b receives the AC power from the input power supply unit 110 when the first switch 120 is turned on, rectifies the AC power, converts the rectified power and supplies the converted power to loads as driving power.

When the normal mode switches to the standby mode, the power key of the remote controller 2 is manipulated such that an off signal can be transmitted to the first receiver 157 or the second receiver 212. The display apparatus 1 may switch to the deep sleep mode when the off signal is received through the first receiver 125 and switch to the sleep mode when the off signal is received through the second receiver 212.

Furthermore, when the second controller 211 inactivates the first receiver 157 in the normal mode, the second controller 211 can transmit a command for switching to the standby mode to the first controller 158.

When the second receiver 212 receives the off signal, the second controller 211 can transmit the command for switching to the standby mode to the first controller 158.

Figure 10:
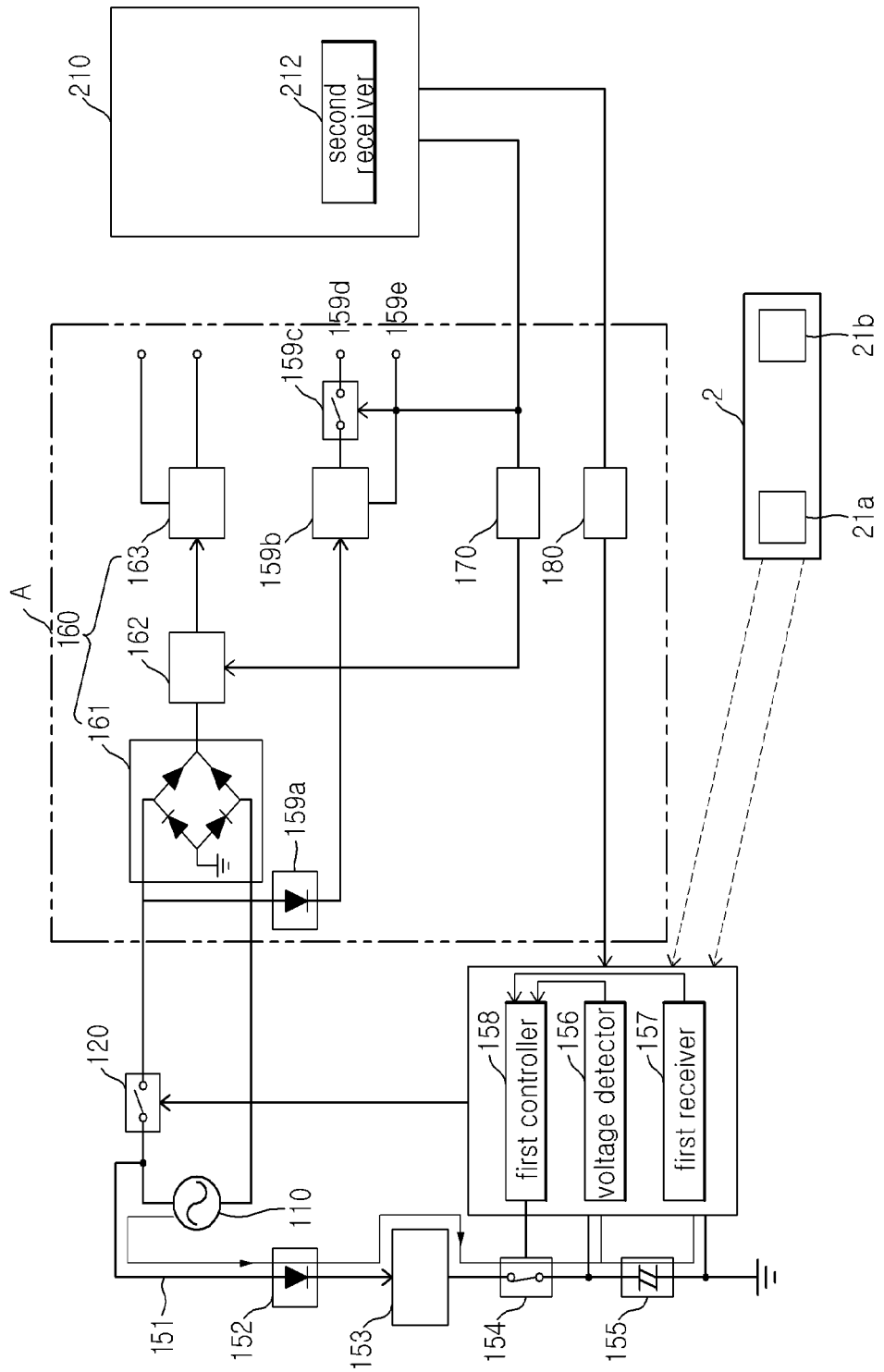
FIG. 10 shows driving power flow of the power supply in a deep sleep mode of the display apparatus shown in FIG. 8.

FIG. 10 shows a driving power flow between the power supply 100 and the load 200 when the display apparatus 1 operates in the deep sleep mode, according to an exemplary embodiment.

When an off signal is input through the remote controller 2, the power supply 100 switches the mode of the display apparatus 1 from the normal mode to the standby mode. Here, the power supply 100 checks the mode stored in the storage unit 213. When the mode is the deep sleep mode, the power supply 100 controls the standby mode of the display apparatus 1 to switch to the deep sleep mode.

To achieve this, the power supply 100 turns the first switch 120 off.

Then, power supplied from the input power supply unit 110 to the load 200 is blocked and the second standby power unit 150b does not generate power. That is, components included in an area 'A' do not operate.

The first standby power unit 150a charges and discharges the charging unit 155 regardless of turning off of the first switch 120 to supply driving power to the components of the display apparatus 1.

More specifically, the AC power of the input power supply unit 110 is applied to the second rectifier 152, rectified by the second rectifier 152, and then output to the first power converter 153. The power output to the first power converter 153 is converted to power for charging and then output to the charging unit 155.

When the charging unit 155 has been fully charged, the second switch 154 is turned off. When the charging unit 155 is discharged, the second switch 154 is turned on such that the power converted by the first power converter 153 is applied to the charging unit 155.

The first receiver 157 and the first controller 158 are driven by the power supplied from the charging unit 155. The first controller 158 driven by the power of the charging unit 155 maintains the first switch 120 in an on state.

As described above, the first standby power unit 150a performs charging and discharging of the charging unit 155 to provide standby power to the first controller 158 and the first receiver 157. Here, the first controller 158 controls charging of the charging unit 155 on the basis of the voltage of the charging unit 155.

Figure 11:
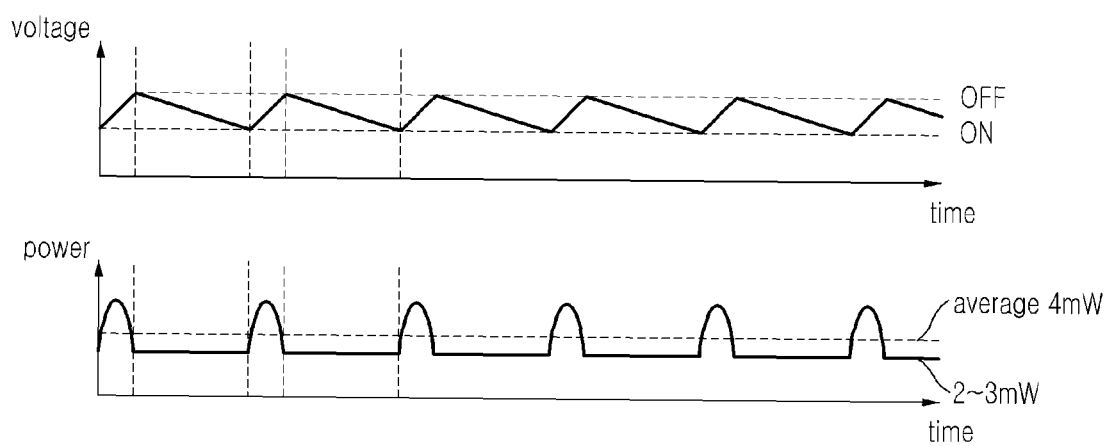
FIG. 11 illustrates charging and discharging operations of a charging unit included in the power supply in the deep sleep mode of the display apparatus shown in FIG. 8.

Referring to FIG. 11, the power supply 100 compares a voltage detected from the charging unit 155 with a reference voltage and maintains the second switch 154 in an off state when the detected voltage is higher than the reference voltage. If the detected voltage is lower than the reference voltage, the power supply 100 turns the second switch 154 on such that the charging unit 155 performs a charging operation. The power supply 100 re-detects the voltage of the charging unit 155 while the charging unit 155 performs a charging operation, compares the re-detected voltage with a full-charge voltage, and turns the second switch 154 off to stop charging when the re-detected voltage is higher than the full-charge voltage.

As described above, the power of the charging unit 155 increases when the second switch 154 is turned on and is discharged with the lapse of time.

The charging unit 155 supplies an average of 4 mW as standby power of the first controller 158 and the first receiver 157 and performs charging when the power of the charging unit 155 is maintained as a minimum of 2 mW for a predetermined time.

If the first receiver 157 receives a power on signal of the remote controller 2 in the deep sleep mode, the first receiver 157 transmits the power on signal to the second controller 211. Here, the first controller 158 turns the first switch 120 on such that the AC power of the input power supply unit 110 is applied to the second and third rectifiers 150 and 170, and then turns the third and fourth switches 160 and 165 on such that the power converted by the second power converter 159b and the driving power converter 163 is output.

Figure 12:
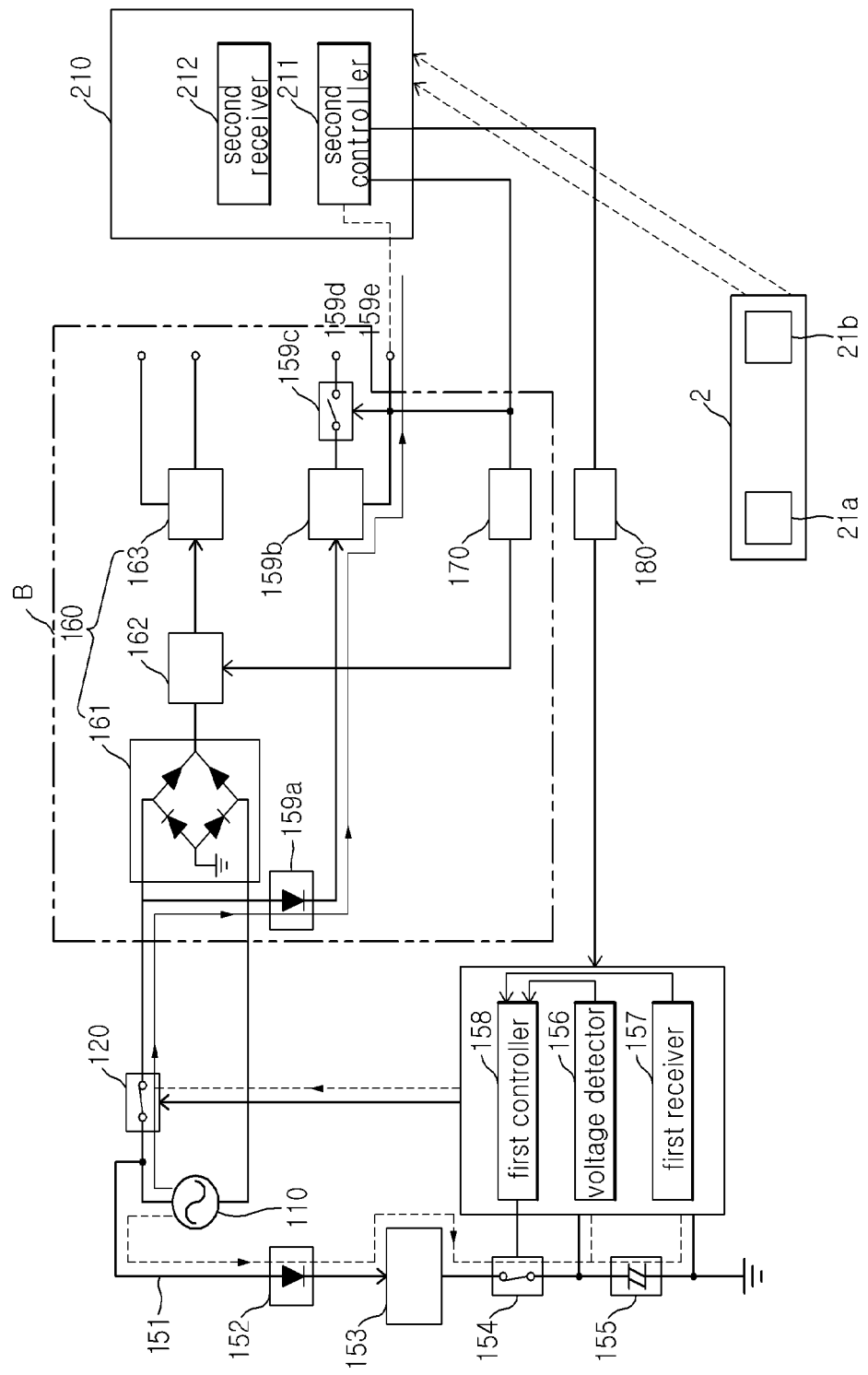
FIG. 12 shows standby power flow of the power supply in a sleep mode of the display apparatus shown in FIG. 8.

FIG. 12 shows a driving power flow between the power supply 100 and the load 200 when the display apparatus 1 operates in the sleep mode, according to an exemplary embodiment.

The power supply 100 turns the first switch 120 on in the sleep mode.

The first standby power unit 150a performs charging and discharging of the charging unit 155 irrespective of turning on of the first switch 120 to supply driving power to the first controller 158 and the first receiver 157. However, the first receiver 157 is inactivated because the display apparatus 1 operates in the sleep mode.

Accordingly, the on signal of the remote controller 2 for canceling the standby mode can be received through the second receiver 212.

Then, the first switch 120 is turned on such that the AC power of the input power supply unit 110 is applied to the first and third rectifiers 161 and 159a through the first switch 120.

The third rectifier 159a rectifies the input AC power and outputs the rectified power to the second power converter 159b.

The second power converter 159b converts the rectified power to power at a predetermined level and outputs the converted power to the second controller 211 through the second output port 159d. Here, the second output port 159d of the second power converter 159b and the second controller 211 are electrically connected to each other.

When the power is applied through the second output port 159d of the second power converter 159b, the second controller 211 checks the mode stored in the storage unit 213 and determines whether the checked mode is the deep sleep mode.

When the checked mode is the sleep mode, the second controller 211 instructs the first controller 158 to maintain the inactivated state of the first receiver 157 and to maintain the on state of the first switch 120.

When the checked mode is the sleep mode and the on signal is not received from the remote controller 2, the second controller 211 maintains the third and fourth switches 160 and 165 in an off state such that the power converted by the second and third power converters 155 and 180 is not output. That is, components included in an area 'B' do not operate.

If the second receiver 212 receives a power on signal from the remote controller 2 in the sleep mode, the second receiver 212 transmits the power on signal to the second controller 211. In this case, the second controller 211 turns the fourth and fifth switches 159c and 170 on such that the power converted by the second power converter 159b and the driving power converter 163 is output.

The process of outputting the power from the second power converter 159b and the driving power converter 153 according to turning on of the fourth and fifth switches 159c and 170 corresponds to that described with reference to FIG. 10.

Figure 13:
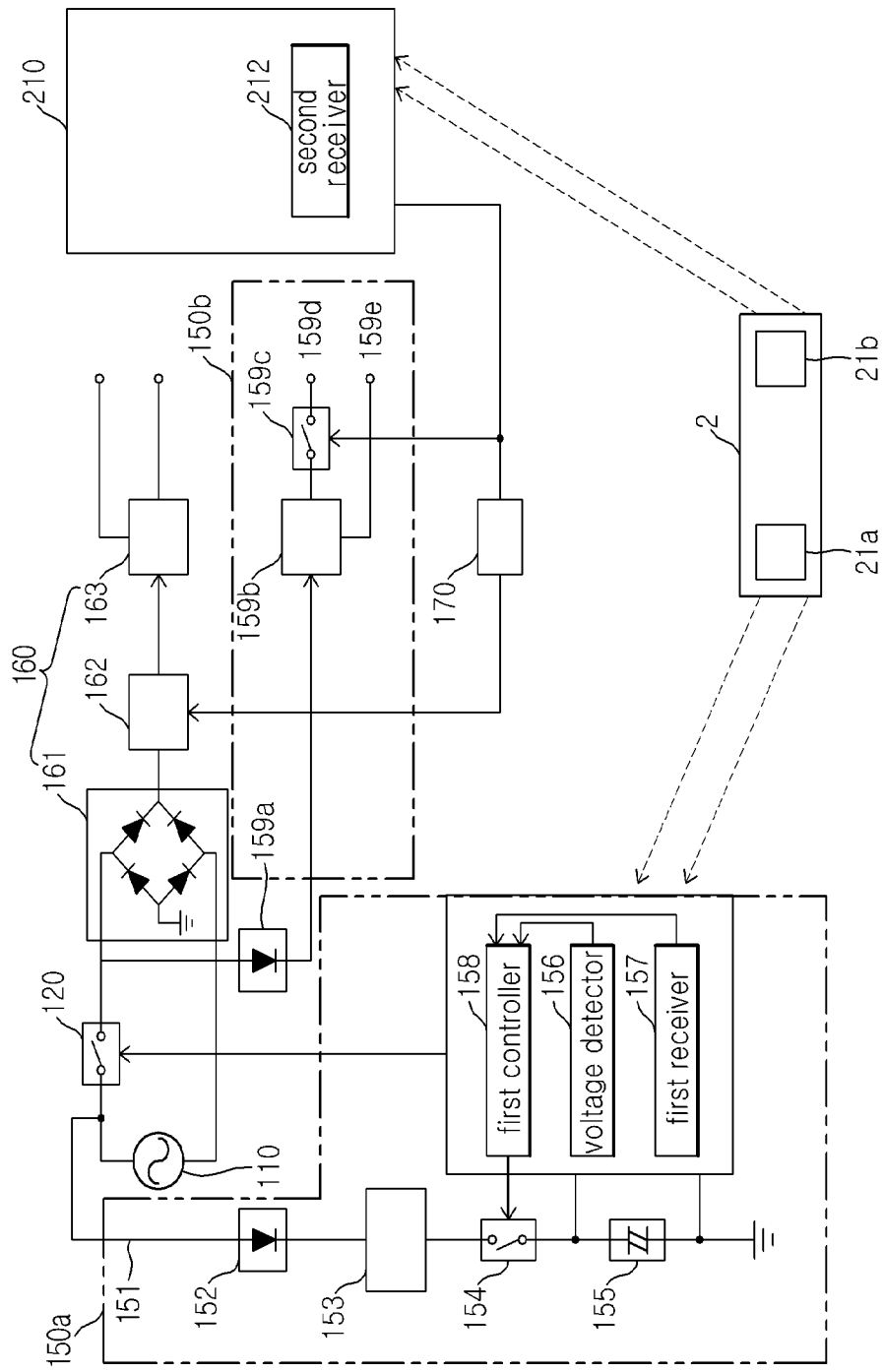
FIG. 13 shows a configuration of a power supply according to another exemplary embodiment.

FIG. 13 is a block diagram of a power supply 100 according to another exemplary embodiment.

Referring to FIG. 13, the power supply 100 includes the input power supply unit 110 (e.g., input power supplier), the first switch 120, the power-saving power supply unit 150 (e.g., power-saving power supplier), and the driving power supply unit 160 (e.g., driving power supplier).

The power supply 100 performs the standby mode and the normal mode.

Here, in the present exemplary embodiment, the standby mode includes only the deep sleep mode.

The first controller 158 turns the first switch 120 on in the deep sleep mode and turns the first switch 120 on in the sleep mode and the normal mode. Accordingly, power supplied to loads is blocked in the deep sleep mode and power is provided to at least one load in the normal mode and sleep mode.

The first controller 158 compares the voltage of the charging unit 155 with the first reference voltage, turns the second switch 154 on when the voltage of the charging unit 155 is lower than the first reference voltage, and turns the second switch 154 off when the voltage of the charging unit 155 is higher than the second reference voltage.

The first receiver 157 waits to receive a power on/off signal from the remote controller 2 while receiving the power from the charging unit 155 to perform the deep sleep mode.

The first standby power unit 150a generates standby power using power of the primary side before power conversion on the basis of the second power converter 159b and the driving power converter 163, whereas the second standby power unit 150b generates driving power using power of the secondary side after power conversion on the basis of the second power converter 159b and the driving power converter 163.

In this manner, the power charged in the super capacitor corresponding to the charging unit 155 is supplied as driving power of the first receiver 157 for receiving an on/off signal of the remote controller 2 and the first controller 158, and thus it is possible to make standby power zero.

A load 200 to which power is supplied from the power supply 100 according to an exemplary embodiment will now be briefly described.

The second controller 211 receives the power converted by the second power converter 159b in the normal mode and controls the fourth and fifth switches 159c and 170 to supply the power converted by the second power converter 159b and the driving power converter 163 to the driver 230, the light source 220, the second controller 211 and the second receiver 212.

The second controller 211 controls operations of the driver 230 and the light source 220 on the basis of a driving command transmitted from the second receiver 212 in the normal mode.

When power is re-supplied in the state that power is blocked, the second controller 211 switches the deep sleep mode to the normal mode. To achieve this, the second controller 211 turns the fourth and fifth switches 159c and 170 on. Accordingly, the power converted by the second power converter 159b and the driving power converter 163 is supplied to the driver 230 and the light source 220.

The second controller 211 controls the sleep mode to be maintained if standby power is continuously applied through the second power converter 159b.

While exemplary embodiments described above are with reference to the display apparatus 1 as an exemplary electric device, it is understood that one or more other exemplary embodiments can be applied to any electric device that receives a power on/off command and a driving command through a remote controller.

Although a few exemplary embodiments have been shown and described, it would be appreciated by those skilled in the art that changes may be made in these exemplary embodiments without departing from the principles and spirit of the inventive concept, the scope of which is defined in the claims and their equivalents.

What is claimed is:

1. A power supply comprising:
   a first switch arranged between an input power supplier and a load;
   a driving power supplier which receives input power from the input power supplier through the first switch and which supplies the received input power to the load as driving power when a current mode of the load is a normal mode; and
   a power-saving power supplier connected to a power line branched from a point between the input power supplier and the first switch, the power-saving power supplier generating standby power using the input power when the current mode of the load is a standby mode,
   wherein the power-saving power supplier comprises:
      a voltage adjuster which adjusts a voltage of the input power supplied through the power line to a voltage at a predetermined level,
      a second switch connected to the voltage adjuster,
      a first power converter connected to a standby power output port, the first power converter converting power corresponding to the adjusted voltage to the standby power and outputting the standby power to the standby power output port, a charger which charges power transmitted through the first power converter and which outputs the charged power as the standby power, a voltage detector which detects a voltage of the power charged in the charger, and a first controller which receives driving power from the charger and which controls an operation of the second switch according to the detected voltage.

2. The power supply according to claim 1, wherein the charger is connected in parallel between the first power converter and the standby power output port.

3. The power supply apparatus according to claim 2, wherein:

the power-saving power supplier further comprises a third switch connected to the charger; and the first controller controls the second switch to be turned on such that the standby power converted by the first power converter is applied to the load and controls the third switch to be turned off when the current mode of the load is the normal mode.

4. The power supply according to claim 3, wherein the first controller controls the second switch and the third switch to be turned off such that the charged power is output when the current mode of the load is the standby mode.

5. The power supply according to claim 4, wherein the power-saving power supplier further comprises a booster which converts the voltage of the power output from the charger to a predetermined voltage and which applies the predetermined voltage to the load.

6. The power supply according to claim 4, wherein the first controller controls the second switch and the third switch to be turned on when the detected voltage is determined to be lower than a first reference voltage.

7. The power supply according to claim 6, wherein the first controller controls the second switch and the third switch to be turned off when the detected voltage is determined to be higher than the first reference voltage.

8. The power supply according to claim 1, wherein:

the power-saving power supplier further comprises:

a voltage adjuster which adjusts the voltage of the input power supplied through the power line to a voltage at a predetermined level, and a first power converter serially connected to the charger to convert power corresponding to the adjusted voltage to power for charging of the charger and to apply the converted power to the charger; and the first controller controls the second switch to be turned off such that the power charged in the charger is output to the load and controls the second switch to be turned on when the detected voltage is determined to be lower than a first reference voltage.

9. The power supply according to claim 1, wherein the first switch is turned on when an on signal is input from the load and turned off when an off signal is input from the load.

10. The power supply according to claim 1, wherein the charger comprises a super capacitor.

11. The power supply according to claim 1, wherein the driving power supplier comprises:

a first rectifier which rectifies the received input power applied through the first switch;

a power factor improver connected to the first rectifier to improve a power factor of the rectified power rectified by the first rectifier; and a driving power converter connected to the power factor improver to convert the power with the improved power factor to power for driving the load and to output the converted power to the load.

12. The power supply according to claim 11, wherein:

the power-saving power supplier further comprises a first receiver which receives a power on/off signal of the load from a remote controller and which receives the power for driving from the charger; and the first controller checks the current mode of the load according to a signal transmitted from the remote controller, controls the first switch to be turned on when the current mode of the load is the normal mode, and controls the first switch to be turned off when the current mode of the load is the standby mode.

13. The power supply according to claim 12, wherein the power-saving power supplier further comprises:

a second rectifier connected to the power line to rectify the input power supplied from the input power supplier; and a first power converter which converts the power rectified by the second rectifier and which outputs the converted power to the charger.

14. The power supply according to claim 12, wherein the power-saving power supplier further comprises:

a third rectifier arranged between the first switch and the first rectifier to rectify the input power applied through the first switch; and a second power converter which converts the power rectified by the second rectifier to the standby power and which outputs the standby power to the load.

15. The power supply according to claim 14, wherein:

the power-saving power supplier further comprises a fourth switch connected to a first standby power output port of the second power converter and turned on in response to a control signal of a second controller included in the load; and the second power converter outputs the standby power through the first standby power output port when the fourth switch is turned on and outputs the standby power through a second standby power output port of the second power converter when the fourth switch is turned off.

16. The power supply according to claim 12, further comprising:

a fifth switch arranged between a second controller of the load and the power factor improver and turned on in response to a control signal of the second controller of the load, wherein the power factor improver is driven to improve the power factor of the power rectified by the first rectifier when the fifth switch is turned on, and apply the power with the improved power factor to the driving power converter.

17. A power supply comprising:

a first switch arranged between an input power supplier and a load;

a driving power supplier which receives input power from the input power supplier through the first switch, which converts the received input power, and which supplies the converted input power to the load as driving power when a current mode of the load is a normal mode; and a power-saving power supplier connected to a power line branched from a point between the input power supplier and the first switch, the power-saving power supplier converting the input power to a standby power, wherein the power-saving power supplier comprises:

a first standby power supplier comprising a second switch connected to the power line, a charger which charges power transmitted through the second switch, a voltage detector which detects a voltage of the charger, and a first receiver which receives a signal of a remote controller, the first standby power supplier supplying the power charged in the charger to the first receiver as standby power;

a second standby power supplier which converts the input power supplied through the first switch to standby power and which applies the standby power to a second receiver included in the load; and a first controller which controls an operation of the first switch such that the standby power is supplied through at least one of the first standby power supplier and the second standby power supplier and which controls an operation of the second switch according to the detected voltage when the current mode of the load is a standby mode.

18. The power supply according to claim 17, wherein the driving power supplier comprises:

a first rectifier arranged between the first switch and the load to rectify the input power;

a power factor improver connected to the first rectifier to improve a power factor of the rectified power rectified by the first rectifier; and a driving power converter connected to the power factor improver to convert the power with the improved power factor to driving power for driving the load and to output the driving power to the load.

19. The power supply according to claim 17, wherein:

the first standby power supplier further comprises a second rectifier which rectifies the input power input from the input power supplier, and a first power converter which converts the rectified power to power at a predetermined level and which applies the converted power to the charger; and the second standby power supplier comprises a third rectifier arranged between the first switch and the second rectifier to rectify the input power applied through the first switch, and a second power converter which converts the power rectified by the third rectifier to standby power and which outputs the standby power through a first standby power output port or a second standby power output port.

20. The power supply according to claim 19, wherein the second standby power supplier further comprises a fourth switch connected to the first standby power output port, turned on in the normal mode, and turned off in the standby mode.

21. The power supply according to claim 17, further comprising a fifth switch turned off in the standby mode and turned on in the normal mode, the fifth switch applying power to the power factor improver such that the power factor improver operates.

22. The power supply according to claim 17, wherein the first controller compares the detected voltage with reference voltages, controls the second switch to be turned on when the detected voltage is determined to be lower than a first reference voltage of the reference voltages, and controls the second switch to be turned off when the detected voltage is determined to be higher than a second reference voltage of the reference voltages.

23. The power supply according to claim 17, wherein the first controller controls the load to operate in the normal mode when an on signal is received from the remote controller and controls an operation of the second switch according to the detected voltage in the normal mode.

24. The power supply according to claim 17, wherein the first controller controls the first switch to be turned off such that the first receiver receives a signal of the remote controller when a deep sleep mode selection signal is transmitted from the load in the standby mode, and controls the first switch to be turned on such that the second receiver receives the signal of the remote controller when a sleep mode selection signal is transmitted in the standby mode.

25. The power supply according to claim 24, further comprising:

a sixth switch arranged between a second controller included in the load and the first controller, wherein the first controller receives the sleep mode selection signal and interrupts an operation of the first receiver when the sixth switch is turned on.

26. The power supply according to claim 24, wherein the first controller controls the first switch to be maintained in a turned off state when the first receiver receives an off signal while the deep sleep mode is selected and controls the first switch to be turned on when the first receiver receives an on signal while the deep sleep mode is selected.

27. A power-saving power supplier connected to a power supply for a load, from a point between an input power supplier and the load, the input power supplier supplying driving power to the load when a current mode of the load is a normal mode, the power-saving power supplier comprising:

a voltage adjuster which adjusts a voltage of the input power supplied through the point to a voltage at a predetermined level;

a switch connected to the voltage adjuster, a power converter connected to a standby power output port, the power converter converting power corresponding to the adjusted voltage to the standby power and outputting the standby power to the standby power output port, a charger which charges input power transmitted from the input power supplier through the power converter and which outputs the charged power as standby power when the current mode of the load is a standby mode, a voltage detector which detects a voltage of the power charged in the charger, and a controller which receives driving power from the charger and which controls an operation of the switch according to the detected voltage.

28. The power-saving power supplier according to claim 27, wherein the charger is connected in parallel between the power converter and the standby power output port.

29. The power-saving power supplier according to claim 28, further comprising:

another switch connected to the charger, wherein the controller controls the switch to be turned on such that the standby power converted by the power converter is applied to the load and controls the other switch to be turned off when the current mode of the load is the normal mode.

30. The power-saving power supplier according to claim 29, wherein the controller controls the switch and the other switch to be turned off such that the charged power is output when the current mode of the load is the standby mode.

* * * * *